US010360502B2

(12) United States Patent
Shankar et al.

(10) Patent No.: US 10,360,502 B2
(45) Date of Patent: Jul. 23, 2019

(54) GENERATING A STATE DIAGRAM

(71) Applicant: The MathWorks, Inc., Natick, MA (US)

(72) Inventors: Siddhartha Shankar, Chicago, IL (US); Srinath Avadhanula, Sudbury, MA (US); Vijaya Raghavan, Brookline, MA (US); Ebrahim Mehran Mestchian, Newton, MA (US); Yao Ren, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 205 days.

(21) Appl. No.: 13/768,541

(22) Filed: Feb. 15, 2013

(65) Prior Publication Data
US 2013/0212054 A1    Aug. 15, 2013

Related U.S. Application Data

(60) Provisional application No. 61/599,311, filed on Feb. 15, 2012.

(51) Int. Cl.
*G06N 5/02* (2006.01)
*G06F 8/10* (2018.01)
*G06F 9/448* (2018.01)

(52) U.S. Cl.
CPC .................. *G06N 5/02* (2013.01); *G06F 8/10* (2013.01); *G06F 9/4498* (2018.02)

(58) Field of Classification Search
CPC .............................. G06N 5/02; G06F 9/4498
See application file for complete search history.

(56) References Cited

U.S. PATENT DOCUMENTS

| 5,485,600 A | 1/1996 | Joseph et al. |
| 5,870,590 A | 2/1999 | Kita et al. |

(Continued)

FOREIGN PATENT DOCUMENTS

| EP | 0597316 A2 | 5/1994 |
| JP | 02-206861 A | 8/1990 |

(Continued)

OTHER PUBLICATIONS

Statechart and Activity Diagrams retrieved from https://web.archive.org/web/20120421022634/http://www.cs.sjsu.edu/~pearce/modules/lectures/uml/behavior/behavior.htm (Year: 2012).*

(Continued)

*Primary Examiner* — Scott A. Waldron
*Assistant Examiner* — Kevin W Figueroa
(74) *Attorney, Agent, or Firm* — Cesari and McKenna, LLP; Michael R. Reinemann

(57) ABSTRACT

A computing device may include a memory to store data that describes a state machine model that includes destination states and source states. The source states may be associated with conditions upon which the state machine model is to transition from a corresponding source state to one of the destination states. The device may also include a processor configured to generate data to describe a state diagram from the data that describes the state machine model. The state diagram may include the graphical symbols and lines. Each of the graphical symbols may represent one of the source states or one of the destination states. The lines may represent transitions and include one or more vertical lines to represent transitions to one of the destination states from more than one of the source states. The graphical symbol may represent the one of the destination states is not adjacent to the graphical symbols to represent the more than one of the source states. The processor may arrange graphical (Continued)

symbols in a first row, arrange lines, and arrange vertical lines in a second row that does not overlap with the first row.

36 Claims, 9 Drawing Sheets

(56) References Cited

U.S. PATENT DOCUMENTS

| | | | |
|---|---|---|---|
| 5,920,718 | A | 7/1999 | Uczekaj et al. |
| 7,010,778 | B2 | 3/2006 | Cook |
| 7,694,273 | B2 | 4/2010 | Kodosky et al. |
| 7,720,656 | B2 | 5/2010 | Raghavan et al. |
| 7,840,913 | B1 | 11/2010 | Agrawal et al. |
| 7,948,495 | B1 | 5/2011 | Nordquist |
| 7,958,454 | B2 | 6/2011 | Gaudette |
| 7,987,448 | B2 | 7/2011 | Kodosky et al. |
| 8,266,584 | B2 | 9/2012 | Hartadinata et al. |
| 8,479,151 | B2 | 7/2013 | Merriman et al. |
| 8,843,879 | B2 | 9/2014 | Howard |
| 8,856,667 | B2 | 10/2014 | Gaudette |
| 2002/0083413 | A1 | 6/2002 | Kodosky |
| 2003/0052919 | A1 | 3/2003 | Tlaskal et al. |
| 2003/0093239 | A1 | 5/2003 | Schmit |
| 2004/0205703 | A1 | 10/2004 | Harel |
| 2005/0055695 | A1 | 3/2005 | Law et al. |
| 2005/0235254 | A1 | 10/2005 | Audfray et al. |
| 2006/0156032 | A1 | 7/2006 | Panjwani |
| 2006/0175413 | A1 | 8/2006 | Longacre et al. |
| 2006/0235548 | A1 | 10/2006 | Gaudette |
| 2006/0294493 | A1 | 12/2006 | Melby |
| 2007/0198923 | A1 | 8/2007 | Kodosky |
| 2007/0266329 | A1 | 11/2007 | Gaudette |
| 2008/0059621 | A1 | 3/2008 | Raghavan et al. |
| 2008/0080653 | A1 | 4/2008 | Hajimiri et al. |
| 2008/0147580 | A1* | 6/2008 | Pannese ................. G05B 15/02 706/33 |
| 2008/0243470 | A1 | 10/2008 | Iwashita |
| 2008/0263512 | A1 | 10/2008 | Dellas et al. |
| 2008/0263516 | A1 | 10/2008 | Hartadinata |
| 2009/0013307 | A1* | 1/2009 | Raghavan ........... G06F 17/5009 717/106 |
| 2009/0044171 | A1 | 2/2009 | Avadhanula |
| 2009/0204940 | A1 | 8/2009 | Kodosky |
| 2010/0131917 | A1 | 5/2010 | Iwamasa |
| 2011/0060707 | A1 | 3/2011 | Suzuki |
| 2011/0093694 | A1 | 4/2011 | Nedbal et al. |
| 2011/0137634 | A1 | 6/2011 | Avadhanula et al. |
| 2011/0161926 | A1 | 6/2011 | Cruise et al. |
| 2011/0246962 | A1 | 10/2011 | Meijer et al. |
| 2011/0283254 | A1 | 11/2011 | Merriman |
| 2011/0288830 | A1* | 11/2011 | Garg et al. ........................ 703/2 |
| 2013/0117042 | A1 | 5/2013 | Tajima |
| 2013/0290925 | A1 | 10/2013 | Shankar et al. |

FOREIGN PATENT DOCUMENTS

| | | | |
|---|---|---|---|
| JP | 04-152473 | A | 5/1992 |
| JP | 06-035890 | A | 2/1994 |
| JP | 2010-134721 | A | 6/2010 |
| WO | 2007006869 | A1 | 1/2007 |
| WO | WO-2007006869 | A1 | 1/2007 |
| WO | 2008027598 | A2 | 3/2008 |
| WO | WO-2008027598 | A2 | 3/2008 |
| WO | WO-2011/071016 | A | 6/2011 |

OTHER PUBLICATIONS

International Search Report dated Jun. 17, 2013, issued in corresponding PCT application PCT/US2013/026407, 9 pages.
International Search Report and Written Opinion dated Jun. 17, 2013, issued in corresponding PCT Application No. PCT/US2013/026410, 11 pages.
"State Transition Table", Wikipedia, Dec. 6, 2011. URL: http://en.wikipedia.org/w/index.php?title=State_transition_table&oldid=464362898.
Booch, Grady, et al., "The Unified Modeling Language User Guide", Apr. 2000, pp. 1-391.
Corbett, James C., et al., "Bandera: extracting finite-state models from Java source code", Jun. 2000, pp. 439-448.
D'Amorim, Marcelo, et al., "Delta Execution for Efficient State-Space Exploration of Object-Oriented Programs", Jul. 2007, pp. 50-60.
Harel, David, et al., "Executable Object Modeling with Statecharts", Mar. 1996, pp. 246-257.
Liu, Songqing, et al., "Generating Test Cases via Model-based Simulation", Aug. 2012, pp. 17-24.
Wagenhals, Lee W., et al., "Synthesizing Executable Models of Object Oriented Architectures", Oct. 2003, pp. 266-300.
Angelov, Christo, et al., "Design Models for Reusable and Reconfigurable State Machines", International Conference on Embedded and Ubiquitous Computing (EUC 2005), Springer-Verlag Berlin Heidelberg, vol. 3824, Dec. 6-9, 2005, pp. 152-163.
Gvero, Tihomir, et al., "State Extensions for Java PathFinder," ACM/IEEE 30th International Conference on Software Engineering (ICSE'08), Leipzig, Germany, May 10-18, 2008, pp. 863-866.
Korel, Bogdan, et al., "Slicing of State-Based Models," Proceedings of the International Conference on Software Maintenance (ICSM'03), IEEE Computer Society, Sep. 22-26, 2003, pp. 1-10.
Merseguer, Jose, et al., "A Compositional Semantics for UML State Machines Aimed at Performance Evaluation," Proceedings of the Sixth International Workshop on Discrete Event Systems (WODES'02), IEEE Computer Society, Oct. 4, 2002, pp. 1-8.
Raghunathan, Bhooma, et al., "The Automated Transformation of Statecharts from a Formal Specification to Object-Oriented Software," 48th Midwest Symposium on Circuits and Systems, IEEE, Aug. 7-10, 2005, pp. 319-322.
Xie, Fei, et al., "Model Checking for an Executable Subset of UML," Proceedings of the 16th Annual International Conference on Automated Software Engineering (ASE 2001), IEEE, Nov. 26-29, 2001, pp. 333-336.

* cited by examiner

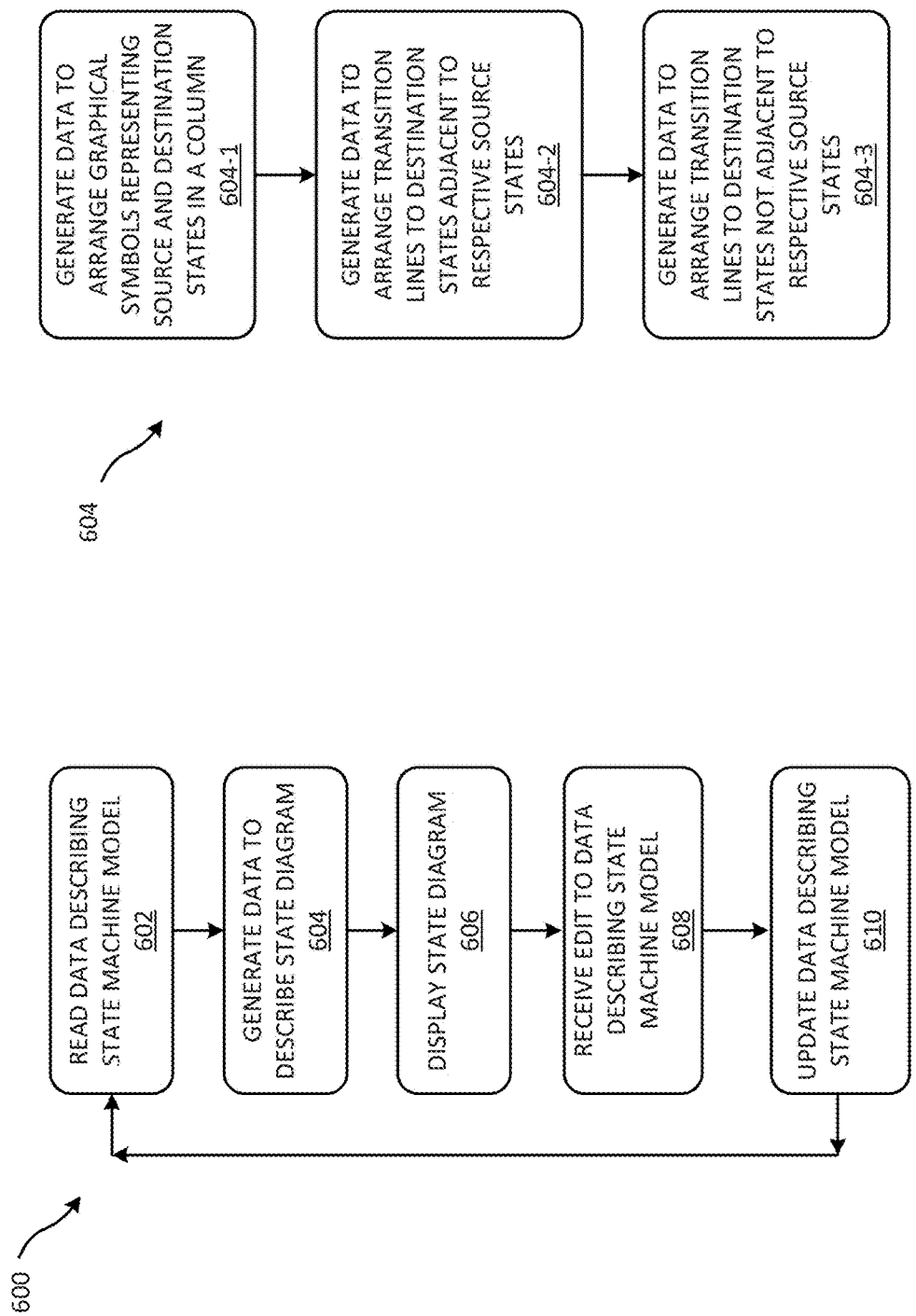

GENERATING A STATE DIAGRAM

RELATED APPLICATIONS

This application claims the benefit of U.S. Provisional Patent Application No. 61/599,311, filed Feb. 15, 2012, which is incorporated herein by reference.

BACKGROUND

A finite-state machine (FSM), or simply a state machine, is a mathematical model used to design computer programs and digital logic circuits, among other things. A state machine can change or transition from one state to another when a condition is met.

BRIEF DESCRIPTION OF THE DRAWINGS

FIGS. 6A and 6B are flowcharts of processes for generating a state diagram from data describing a state machine model.

DETAILED DESCRIPTION

Figures 1A, 1B:
FIG. 1A illustrates a data structure describing a state-state transition table for a state machine model.
FIG. 1B illustrates a data structure describing a state-event or state-condition transition table for a state machine model.

FIG. 1A illustrates a data structure describing a state-state transition table 102 for a state machine model. Table 102 includes a vertical column of fields 104 (e.g., along the left side of table 102) that stores the source states (e.g., the names of states, labels associated with states, annotations associated with states, etc.) of the state machine model (e.g., S1 and S2). Here, "S1" is the name of a state or a label associated with a state. Likewise, "S2" is the name of another state or a label associated with another state.

Table 102 also includes a horizontal row of fields 106 (e.g., along the top of table 102) that stores the destination states of the state machine model (e.g., S1 and S2). As mentioned above, "S1" is the name of a state and "S2" is the name of another state. At the intersection of a row identified by one of the source states and a column identified by one of the destination states, are condition fields that store conditions (or events) (e.g., conditions C11 through C22) upon which the state machine model transitions from the corresponding source state to the corresponding destination state. According to table 102, for example, if the state machine is currently in source state S1, then when condition C12 is satisfied, the state machine may transition to state S2. Conditions C11 through C22 may include Boolean conditions, for example.

Along with conditions, table 102 includes action fields to store actions (e.g., A11 through A22) for the state machine to take (or execute) when the state machine model transitions from a corresponding source state to a corresponding destination state (e.g., when the corresponding condition is satisfied). According to table 102, for example, if the state machine is currently in source state S1 and condition C12 is satisfied, then the state machine takes action A12 at the time it transitions to state S2. Actions A11 through A22 may assign a value to a variable, generate an event, etc. In one embodiment, table 102 may exclude action fields, condition fields, and/or destination fields, for example. Further, in one embodiment, one or more cells in table 102 may exclude an action field, a condition field, and/or a destination field. For example, table 102 may specify an action that is taken when a condition is satisfied but the state machine model does not transition to a different state.

As mentioned, at the intersection of a row (e.g., identified by the name of a source state) and a column (e.g., identified by the name of a destination state) is a condition field and, possibly, an action field. For convenience, the condition field and its corresponding action field may be considered a "cell" that corresponds to the source state and the destination state. As described above, the cell may or may not include an action field, a condition field, or even a destination field. The description of FIG. 1A provides one syntax (e.g., the rules of a state-state table) for determining the semantics (e.g., the meaning) of a state machine model. In one embodiment, the location of the cells in state-state table 102, for example, may affect the execution order of the state machine model and therefore this syntax may also affect the semantic of the state machine model.

FIG. 1B illustrates a data structure describing a state-condition (or state-event) table 112 for a state machine model. Like table 102, table 112 includes a vertical column of fields 114 (e.g., along the left of table 112) that stores the source states (e.g., the names of states, labels associated with states, or annotations associated with states) of the state machine model. Unlike table 102, table 112 includes a horizontal row of fields 116 (e.g., along the top of table 112) that stores conditions or events. At the intersection of a row identified by one of the source states and a column identified by one of the conditions, are destination fields that store destination states to which the state machine may transition when the corresponding condition is satisfied or when an event occurs. According to table 112, for example, if the state machine is currently in source state S1, and condition C2 is satisfied, then the state machine may transition to state S2. As with table 102, conditions C1 and C2 may include Boolean conditions, for example.

Along with conditions, table 112 includes action fields storing actions (e.g., A11 through A22) for the state machine to take (or execute) when in a corresponding source state upon satisfying the corresponding condition (e.g., when the state machine model transitions to a corresponding destination state) or when a corresponding event occurs. According to table 112, for example, if the state machine is currently in source state S1 and condition C2 is satisfied, then the state machine takes action A12 (e.g., at the time it transitions to state S2). Actions A11 through A22 may assign a value to a variable, generate an event, etc. In one embodiment, table 112 may exclude action fields, for example.

As mentioned, at the intersection of a row (e.g., identified by a source state) and a column (e.g., identified by a condition) is a destination state field and, possibly, an action field. For convenience, the destination state field and its corresponding action field may be considered a "cell" that corresponds to the source state and the condition. The cell may or may not include an action field. The description of FIG. 1B provides another syntax (e.g., the rules of a state-condition table) for determining the semantics (e.g., the meaning) of a state machine model. In one embodiment, the location of the cells in state-condition table 112 may affect the execution order of the state machine model, for example, and therefore this syntax may also affect the semantic of the state machine model.

Depending upon the system being modeled by the state machine, a user may select to describe the state machine by a state-state transition table or a state-condition transition table. That is, in some instances, it may be more convenient to choose a state-state transition table and in other instances it may be more convenient to choose a state-condition transition table.

In addition to a state machine model being stored in the manner described above, the state machine model may also be presented (e.g., displayed) as shown in FIGS. 1A and 1B. That is, the user may view the state machine model as state-state transition table 102 on a display or as state-condition transition table 112 on a display.

Figure 1C:
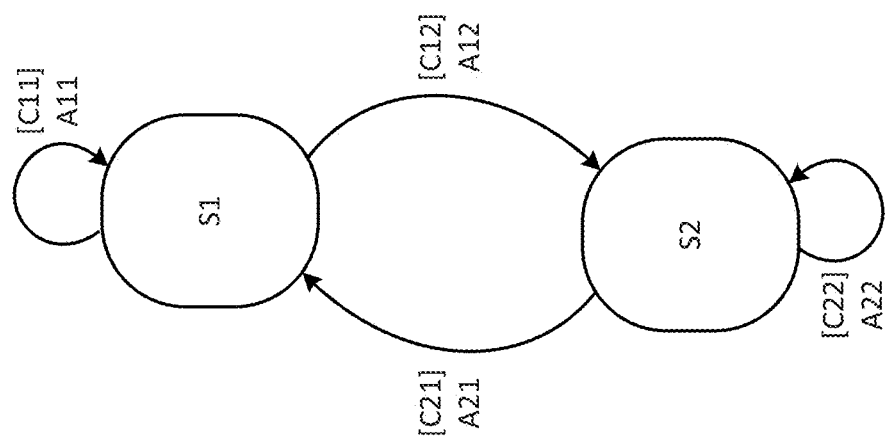
FIG. 1C illustrates a state diagram generated to correspond to the state machine model described in FIG. 1A.

FIG. 1C illustrates a state diagram generated to correspond to the state machine model described in table 102. In FIG. 1C, states are shown with ovals and transitions are shown with arrows between states. Actions and conditions (in brackets) are shown near the associated line representing the transition. The description of FIG. 1C also provides a syntax (e.g., the rules of a state diagram) for determining the semantics (e.g., the meaning) of a state machine model. The syntax of state diagram 122 may also include the symbol shapes (e.g., lines, circles, ovals), the position of the symbols (e.g., from one circle to another), and the location of the symbols (e.g., one symbol above another or the relative position of one symbol to another). In one embodiment, the location of the symbols may affect the execution order of the state machine model, for example, and therefore this syntax may also affect the semantic of the state machine model.

In the above examples, the semantics of the state machine model represented by state diagram 122 are apparently the same as the semantics of the state machine model represented by state-state table 102 even though the syntax is different (assuming, for example, that the order of execution is the same between state diagram 122 and table 102). Further, there is a close relationship between the syntax of state-state table 102 and the syntax of state diagram 122. For example, there is a one-to-one correspondence between the states defined in state fields appearing in column 104 and row 106 (table 102) and circles (e.g., one type of graphical symbol) in state diagram 122. As another example, there is a one-to-one correspondence between transitions defined by conditions in condition fields (C11, C12, C21, and C22) in table 102 and lines (e.g., one type of graphical symbol) in state diagram 122. With more complex state machine models, such a one-to-one correspondence may lead to a semantically correct state diagram representation of a state table (e.g., when generating a state diagram from a state-state table), but one that is very difficult for a human to understand the semantics.

As described below, methods and systems described herein may generate data to describe a state diagram (such as state diagram 122) from data describing a state machine model (such as state-state table 102, state-condition table 112, or a unified state transition table described in more detail below). One embodiment may introduce additional syntactical elements to the state diagram that do not alter the semantic of the state machine model, for example. By introducing additional syntactic elements, the semantics of the state machine model may be more comprehensible by a human. In one embodiment described below, a state diagram (e.g., with the additional syntax) may be generated from a state table or a different state diagram of a state machine model (e.g., while preserving the semantics of the state machine model whatever the source representation of the state machine model). Preserving the semantics of a state machine model means that the semantics of a first state machine model represented by first data is equivalent to the semantics of a second state machine model represented by second data.

Exemplary Modeling Environment

Figure 2A:
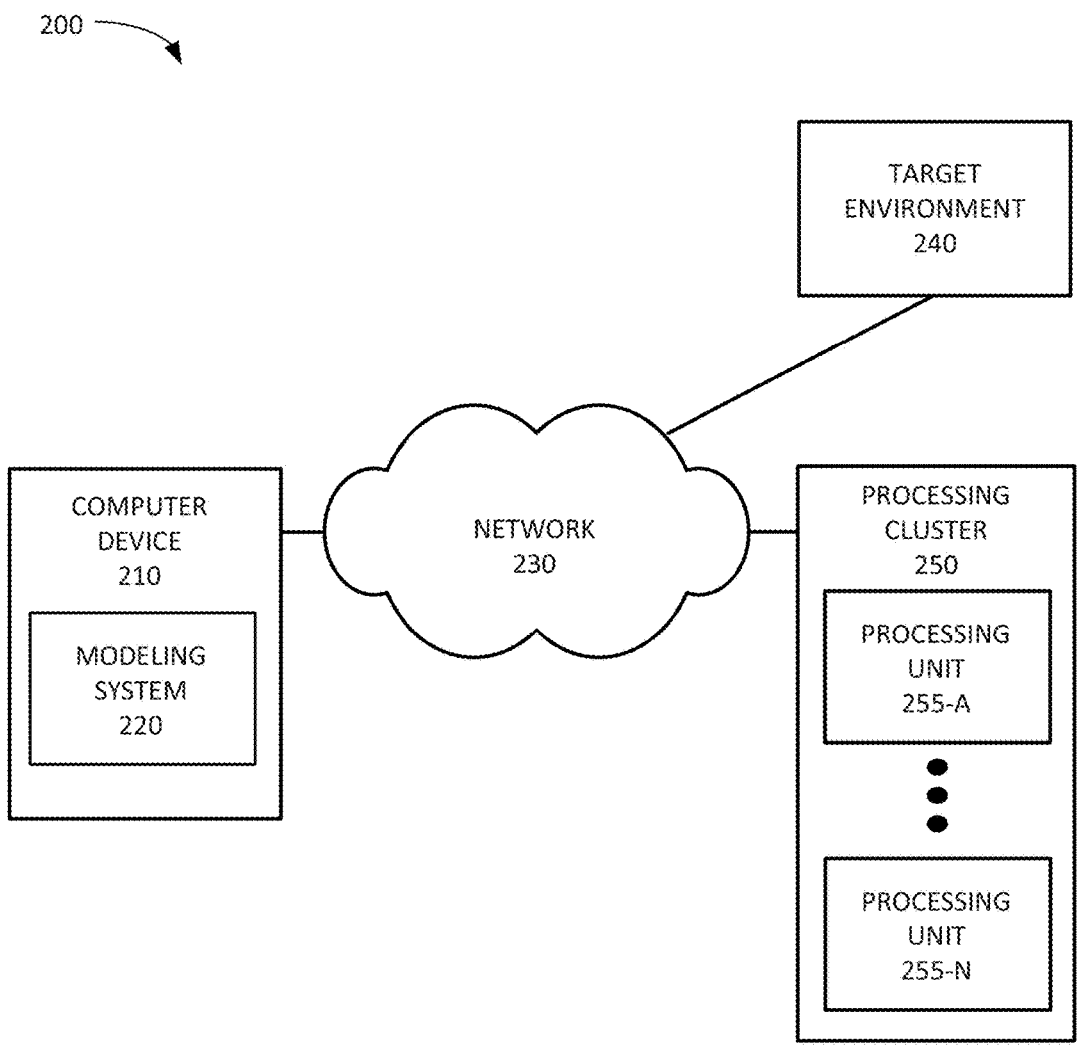
FIG. 2A is a diagram of an exemplary environment for implementing the methods and systems according to one or more embodiments.

FIG. 2A is a diagram of an exemplary environment 200 for implementing methods and systems for generating state diagrams, for example. As shown in FIG. 2A, environment 200 may include a computer device 210, a network 230, a target environment 240, and a processing cluster 250.

Computer device 210 may include one or more computer devices, such as a personal computer, a workstation, a server device, a blade server, a mainframe, a personal digital assistant (PDA), a laptop, a tablet, or another type of computation or communication device. Computer device 210 may include a modeling system 220. Modeling system 220 may include a development tool (e.g., a software application) that enables creation, modification, design, and/or simulation of graphical models representing dynamic systems. Furthermore, modeling system 220 may enable the automatic generation of executable code based on a graphical model. Modeling system 220 may include functionality for providing framework 100 for solving trajectory optimization problems defined by a dynamics model and a costs and constraints model.

Network 230 may enable computer device 210 to communicate with other components of environment 200, such as target environment 240 and/or processing cluster 250. Network 220 may include one or more wired and/or wireless networks. For example, network 220 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a Wi-Fi network, an Ethernet network, a combination of the above networks, and/or another type of wireless network. Additionally, or alternatively, network 230 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Target environment 240 may include one or more devices that may be associated with a dynamic system that is represented by a graphical model in modeling system 220. For example, target environment 240 may include a set of sensors and/or a set of controllers corresponding to a dynamic system. Modeling system 220 may receive data from target environment 240 and use the received data as input to the graphical model. Furthermore, target environment 240 may receive executable code from modeling system 220. The received executable code may enable target environment 240 to perform one or more operations on the dynamic system associated with target environment 240. Target environment 240 may include, for example, an embedded processing device.

Processing cluster 250 may include processing resources which may be used by modeling system 220 in connection with a graphical model. For example, processing cluster 250 may include processing units 255-A to 255-N (referred to herein collectively as "processing units 255" and individually as "processing unit 255"). Processing units 255 may perform operations on behalf of computer device 210. For example, processing units 255 may perform parallel processing in a graphical model in modeling system 220. Modeling system 220 may provide an operation to be performed to processing cluster 250, processing cluster 250 may divide tasks associated with the operation among processing units 255, processing cluster 250 may receive results of the performed tasks from processing units 255, and may generate a result of the operation and provide the result of the operation to modeling system 220.

In one implementation, processing unit 255 may include a graphic processing unit (GPU). A GPU may include one or more devices that include specialized circuits for performing operations relating to graphics processing (e.g., block image transfer operations, simultaneous per-pixel operations, etc.) and/or for performing a large number of operations in parallel. In another example, processing unit 255 may correspond to a single core of a multi-core processor. In yet another example, processing unit 255 may include a computer device that is part of a cluster of computer devices, e.g., computing devices operating as part of a computing cloud.

Although FIG. 2A shows exemplary components of environment 200, in other implementations, environment 200 may include fewer components, different components, differently arranged components, and/or additional components than those depicted in FIG. 2A. Alternatively, or additionally, one or more components of environment 200 may perform one or more tasks described as being performed by one or more other components of environment 200.

Exemplary Computer Device

Figure 2B:
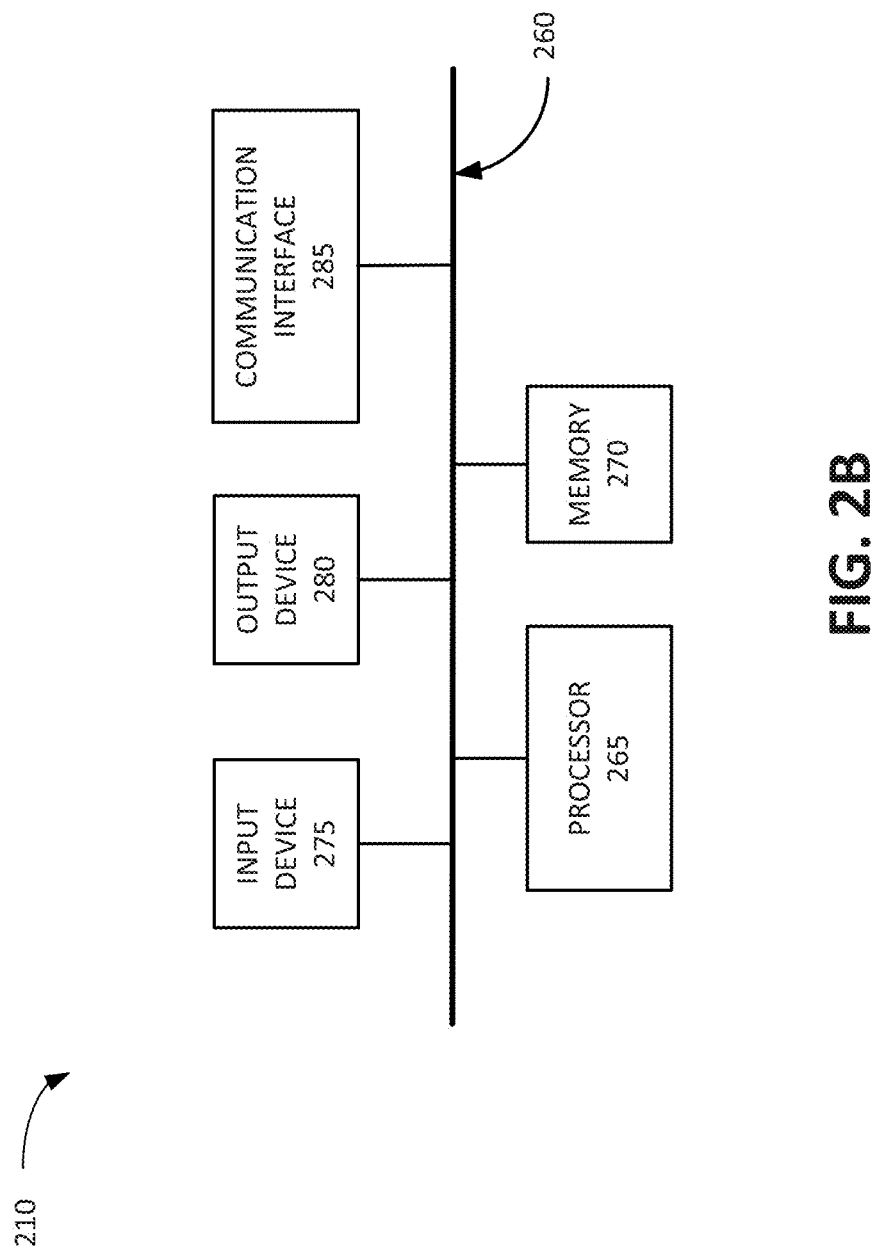
FIG. 2B is a diagram illustrating exemplary components of computer device according to one embodiment.

FIG. 2B is a diagram illustrating exemplary components of computer device 210 according to one embodiment. As shown in FIG. 2B, computer device 210 may include a bus 260, a processor 265, a memory 270, an input device 275, an output device 280, and a communication interface 285.

Bus 260 may include a path that permits communication among the components of computer device 210. Processor 265 may include one or more single-core and/or or multi-core processors, microprocessors, and/or processing logic (e.g., application specific integrated circuits (ASICs), field programmable gate arrays (FPGAs), ARM processors, etc.) that may interpret and execute instructions. Memory 270 may include a random access memory (RAM) device or another type of dynamic storage device that may store information and instructions for execution by processor 265, a read only memory (ROM) device or another type of static storage device that may store static information and instructions for use by processor 265, a magnetic and/or optical recording memory device and its corresponding drive, and/ or a removable form of memory, such as a flash memory.

Input device 275 may include a mechanism that permits an operator to input information to computer device 210, such as a keypad, a keyboard, a button, or an input jack for an input device such as a keypad or a keyboard, a camera, an analog to digital (ADC) converter, a pulse-width modulation (PWM) input, etc. Output device 280 may include a mechanism that outputs information to the operator, including one or more light indicators, a speaker, a digital to analog (DAC) converter, a PWM output, etc.

Output device 280 may include a display device that displays information to a user. The display device may include a cathode ray tube (CRT), plasma display device, light emitting diode (LED) display device, liquid crystal display (LCD) device, etc. The display device may be configured to receive user inputs (e.g., via a touch sensitive screen) if desired. In an embodiment, the display device may display one or more graphical user interfaces (GUIs) to a user. The display device may display a representation of a model, including a state machine model (e.g., a state-state transition table, a state-condition transition table, a state-event transition table, a unified state transition table, and/or state diagram). The model representation may also include a number of entities connected by lines.

Communication interface 285 may include a transceiver that enables computer device 210 to communicate with other devices and/or systems. For example, communication interface 285 may include a modem, a network interface card, and/or a wireless interface card.

As will be described in detail below, computer device 210 may perform certain operations relating to a framework for generating a solution to a trajectory optimization problem. Computer device 210 may perform these operations in response to processor 265 executing software instructions stored in a computer-readable medium, such as memory 270. A computer-readable medium may be defined as a non-transitory memory device. A memory device may include memory space within a single physical memory device or spread across multiple physical memory devices.

The software instructions may be read into memory 270 from another computer-readable medium, or from another device via communication interface 285. The software instructions contained in memory 270 may cause processor 265 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2B shows exemplary components of computer device 210, in other implementations, computer device 210 may include fewer components, different components, additional components, or differently arranged components than depicted in FIG. 2B. Additionally or alternatively, one or more components of computer device 210 may perform one or more tasks described as being performed by one or more other components of computer device 210.

Exemplary Modeling System

Figure 3:
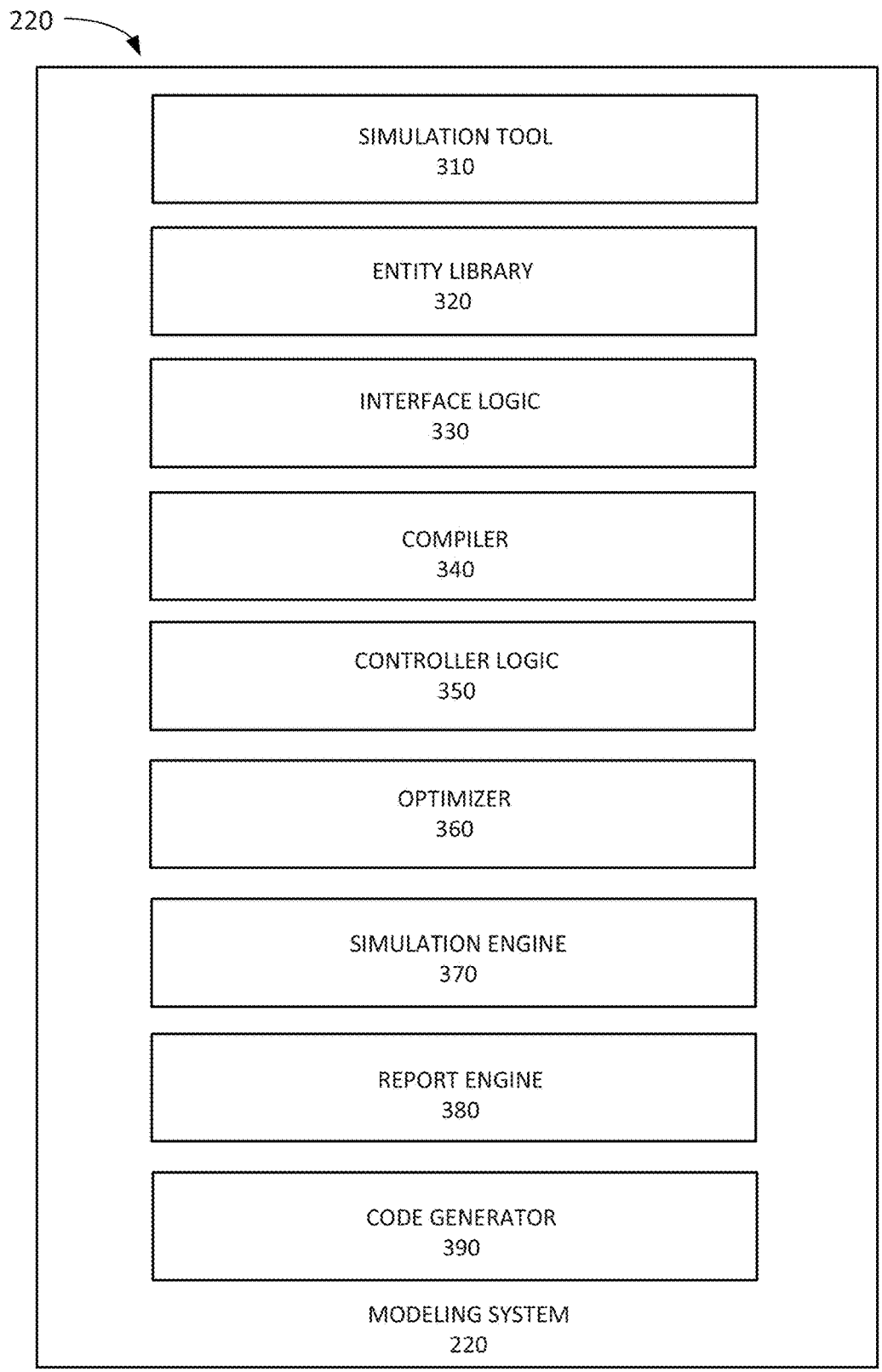
FIG. 3 is a diagram of exemplary components of a modeling system in one embodiment.

FIG. 3 is a diagram of exemplary components of modeling system 220 that may be included in computer device 210. Modeling system 220 may include a development tool that enables existing software components to be used in the creation of a model and that may enable generation of executable code based on the model. For example, the development tool may include a graphical modeling tool or application that provides a user interface for a numerical computing environment. Additionally, or alternatively, the development tool may include a graphical modeling tool and/or application that provides a user interface for modeling and simulating (e.g., by executing a model) a dynamic system (e.g., based on differential equations, difference equations, algebraic equations, discrete events, discrete states, stochastic relations, etc.).

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities my include model elements, such as blocks and/or ports. The relationships may include model elements, such as lines (e.g., connector lines) and references. The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks such as function calls), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., X=2Y) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

Assigning causality to equations may consist of determining which variable in an equation is computed by using that equation. Assigning causality may be performed by sorting algorithms, such as a Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations X=2Y+U and Y=3X−2U may be symbolically processed into one equation 5Y=−U. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally consistent signal flow between blocks, in other implementations, the interactions between blocks may not necessarily be directionally specific or consistent.

In an embodiment, connector lines in a model may represent related variables that are shared between two connected blocks. The variables may be related such that their combination may represent power. For example, connector lines may represent voltage, and current, power, etc. Additionally, or alternatively, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Events may be generated when the continuous-time behavior exhibits specific characteristics. For example, when an inequality changes its truth value between two discrete steps of the numerical solver that approximates the continuous-time behavior, an event may be generated. The time of the event may be assigned the time of either of the two discrete steps, or a value in between the two discrete steps may be obtained that is closest to the time where the truth value changes. This time in between the two discrete time steps may be computed based on a root-finding numerical algorithm that may account for a specified numerical accuracy.

Alternatively, or additionally, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

As another example, an executable graphical model may include a state machine model (e.g., a graphical state machine model). The state machine model may include an executable time-based model. The state machine model may include a discrete-state transition system that evaluates its transitions at certain points in time. The points in time may be based on a periodic (and discrete) sample time or the points in time may be based on the change of truth value of an expression (e.g., an inequality). An evaluation of the transition system may be associated with the occurrence of an event and the evaluation may consist of evaluating whether a transition out of a state is enabled. A transition may be enabled when the associated event(s) occur and when the associated condition(s) are satisfied. The state transition system may have input and output variables that may be obtained from and provided to other entities in the graphical model. As noted above, the graphical entities may represent time-based dynamic systems such as differential equation systems and difference equation systems. In another embodiment, the graphical model and the graphical entities may represent a multi-domain dynamic system. The domains may include execution domains or behaviors such as, for example, continuous time, discrete time, discrete event, state transition systems, and/or a model of computation. The model of computation may be based on differential equations, difference equations, algebraic equations, discrete events, discrete states, stochastic relations, data flows, synchronous data flows, control flows, process networks, and/or state machines.

Modeling system 220 may implement a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Java, etc.

In one implementation, the TCE may include a dynamically typed language that can be used to express problems and/or solutions in mathematical notations familiar to those of skill in the relevant arts. For example, the TCE may use an array as a basic element, where the array may not require dimensioning. In addition, the TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

The TCE may further provide mathematical functions and/or graphical tools (e.g., for creating plots, surfaces, images, volumetric representations, etc.). In one implementation, the TCE may provide these functions and/or tools using toolboxes (e.g., toolboxes for signal processing, image processing, data plotting, parallel processing, etc.). In another implementation, the TCE may provide these functions as block sets. In still another implementation, the TCE may provide these functions in another way, such as via a library, etc. The TCE may be implemented as a text based environment, a graphically based environment, or another type of environment, such as a hybrid environment that is both text and graphically based.

The TCE may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.: Scilab from The French Institution for Research in Computer Science and Control (INRIA); Virtuoso from Cadence; or Modelica or Dymola from Dassault Systèmes.

An alternative embodiment may implement a TCE in a graphically-based TCE using products such as, but not limited to, Simulink®, Stateflow®, SimEvents®, etc., by The MathWorks, Inc.; VisSim by Visual Solutions; LabView® by National Instruments; Dymola by Dassault Systèmes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

A further alternative embodiment may be implemented in a language that is compatible with a product that includes a TCE, such as one or more of the above identified text-based or graphically-based TCEs. For example, MATLAB® (a text-based TCE) may use a first command to represent an array of data and a second command to transpose the array. Another product, that may or may not include a TCE, may be MATLAB®-compatible and may be able to use the array command, the array transpose command, or other MATLAB® commands. For example, the other product may use the MATLAB® commands to perform model checking.

Yet another alternative embodiment may be implemented in a hybrid TCE that combines features of a text-based and graphically-based TCE. In one implementation, one TCE may operate on top of the other TCE. For example, a text-based TCE (e.g., MATLAB®) may operate as a foundation and a graphically-based TCE (e.g., Simulink) may operate on top of MATLAB® and may take advantage of text-based features (e.g., commands) to provide a user with a graphical user interface and graphical outputs (e.g., graphical displays for data, dashboards, etc.).

As shown in FIG. 3, modeling system 220 may include a simulation tool 310, an entity library 320, an interface logic 330, a compiler 340, a controller logic 350, an optimizer 360, a simulation engine 370, a report engine 380, and a code generator 390.

Simulation tool 310 may include an application for building a model. Simulation tool 310 may be used to build a textual model or a graphical model having executable semantics, such as dynamic system model 110 and/or costs and constraints model 120. In the case of graphical models, simulation tool 310 may allow users to create, display, modify, diagnose, annotate, delete, print, etc., model entities and/or connections. Simulation tool 310 may interact with other entities illustrated in FIG. 2 for receiving user inputs, executing a model to obtain a simulation, displaying results, generating code, etc. Simulation tool 310 may provide a user with an editor for constructing or interacting with textual models and/or a GUI for creating or interacting with graphical models. The editor may be configured to allow a user to, for example, specify, edit, annotate, save, print, and/or publish a model. A textual interface may be provided to permit interaction with the editor. A user may write scripts that perform automatic editing operations on a model using the textual interface. For example, the textual interface may provide a set of windows that may act as a canvas for the model, and may permit user interaction with the model. A model may include one or more windows. A model that is partitioned into multiple hierarchical levels may show different hierarchical levels in separate windows.

Entity library 320 may include code modules or entities (e.g., blocks/icons) that a user can drag and drop into a display window that includes a graphical model, such as particular blocks added to dynamic system model 110 and/or costs and constraints model 120. In the case of graphical models, a user may further couple entities using connections to produce a graphical model of a system, such as target environment 140.

Interface logic 330 may allow modeling system 220 to send or receive data and/or information to/from devices (e.g., target environment 240, processing cluster 250, etc.) or software modules (e.g., a function, an application program interface, etc.).

Compiler 340 may compile a model, such as dynamic system model 110, costs and constraints model 120, and/or interface model 130, into an executable format. Code generator 390 may generate code from compiled model produced by compiler 340. The generated code may be executed on computer device 210 to produce a modeling result. In an embodiment, compiler 340 may also provide debugging capabilities for diagnosing errors associated with the model. Code generator 390 may generate executable code for a part of a graphical model. The executable code may then be automatically executed during execution of the model, so that a first part of the model executes as an interpreted execution and a second part of the model executes as a compiled execution.

Controller logic 350 may be used to create and implement controllers in a graphical model. For example, controller logic 350 may provide functionality for entities that represent types of controllers in the graphical model. When the graphical model executes, controller logic 350 may perform control operations on the model by interacting with entities in the graphical model. In an embodiment, controller logic 350 may include control algorithms that implement controllers in the graphical model, such as, for example, feedback control that includes the determined NOC gains associated with framework 100, 'proportional-integral-derivative' (PID) controls, gain scheduling controls, H-infinity controls, model predictive controls (M PC), dynamic inversion controls, bang/bang controls, sliding mode controls, deadbeat controls, and/or other another type of controls. Embodiments of controller logic 350 may be configured to operate in standalone or distributed implementations.

Optimizer 360 may optimize code, parameters, performance (e.g., execution speed, memory usage), etc., for a model. For example, optimizer 360 may optimize code to cause the code to occupy less memory, to cause the code to execute more efficiently, to cause the code to execute faster, etc., than the code would execute if the code were not optimized. Optimizer 360 may also perform optimizations for controller logic 350, e.g., to optimize parameters for a controller. In an embodiment, optimizer 360 may operate with or may be integrated into compiler 340, controller logic 350, code generator 390, etc. Embodiments of optimizer 360 may be implemented via software objects that interact with other object oriented software, e.g., for receiving data on which optimizer 360 operates.

Simulation engine 370 may perform operations for executing a model to simulate a system. Executing a model to simulate a system may be referred to as simulating a model. Simulation engine 370 may be configured to perform standalone or remote simulations based on user preferences or system preferences.

Report engine 380 may produce a report based on information in modeling system 220. For example, report engine 380 may produce a report indicating whether a controller satisfies design specifications, a report indicating whether a controller operates in a stable manner, a report indicating whether a model compiles properly, etc. Embodiments of report engine 380 can produce reports in an electronic format for display on output device 350, in a hardcopy format, and/or a format adapted for storage in a storage device.

Code generator 390 can generate code from a compiled model produced by compiler 340. In an embodiment, code generator 390 may be configured to compile and link the generated code to produce an "in-memory executable" version of a model. The in-memory executable version of model may be used, for example, to simulate, verify, trim, and/or linearize the model. In an embodiment, code generator 390 may receive code in a first format and may transform the code from the first format into a second format. In an embodiment, code generator 390 can generate source code, assembly language code, binary code, interface information, configuration information, performance information, task information, etc., from at least a portion of a model. For example, code generator 390 can generate C, C++, SystemC, Java, Structured Text, hardware description language (HDL), etc., code from the model.

Embodiments of code generator 390 can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Architecture Analysis and Design Language (AADL), Hardware Description Language (HDL), Automotive Open System Architecture (AUTOSAR), etc.). In an embodiment, optimizer 360 can interact with code generator 390 to generate code that is optimized according to a parameter (e.g., memory use, execution speed, multi-processing, etc.). Embodiments of modeling environments consistent with principles of the invention can further include components such as verification components, validation components, etc.

Although FIG. 3 shows exemplary components of modeling system 220, in other implementations, modeling system 220 may include fewer components, different components, differently arranged components, or additional components than depicted in FIG. 3. Additionally or alternatively, one or more components of modeling system 220 may perform one or more tasks described as being performed by one or more other components of modeling system 220.

Exemplary Data Structures and Processes

FIG. 4A illustrates an exemplary data structure 402 (or a unified state transition table 402) describing a state machine model in one embodiment. Table 402 includes a vertical column of fields 404 (e.g., along the left side of table 402) that stores the source states of the state machine model. For one or more of the source state fields, table 402 may also include one or more cells 406 (individually, "cell 406" or "cell 406-*x*"). Computer device 210 may store transition table 402 in memory 270 and may read transition table 402 from memory 270, for example, for evaluation and processing.

Cell 406 may include a condition field identifying a condition upon which, when satisfied, the state machine model may transition from the corresponding source state to a destination state. In one embodiment, the condition field may also specify an event that, when it occurs, causes the conditions (e.g., in the same field) to be evaluated. An event may also be related to a function call. That is, a function-call may be an event may "wake up" a model for evaluation of, for example, a condition.

Cell 406 may also include a destination field identifying the destination state for the state machine model to transition to when the corresponding condition (e.g., in the same cell) is satisfied. Cell 406 may also include an action field identifying an action to be taken by the state machine model when the corresponding condition (e.g., in the same cell) is satisfied and the state machine model transitions to the corresponding destination state (e.g., in the same cell). In one embodiment, unified state transition table 402 may exclude action fields, condition fields, and/or destination fields, for example. In the embodiment in which the condition field specifies an event, the action field identifies the action to be taken by the state machine model when the corresponding event occurs and the corresponding condition is satisfied. For convenience and ease of understanding, in the example embodiment of FIG. 4, condition fields in transition table 402 are considered not to include events. In the case where a destination field is omitted, a default transition may occur (e.g., the destination state of an adjacent cell, the destination state of a cell in a template row, etc.).

Figure 4:
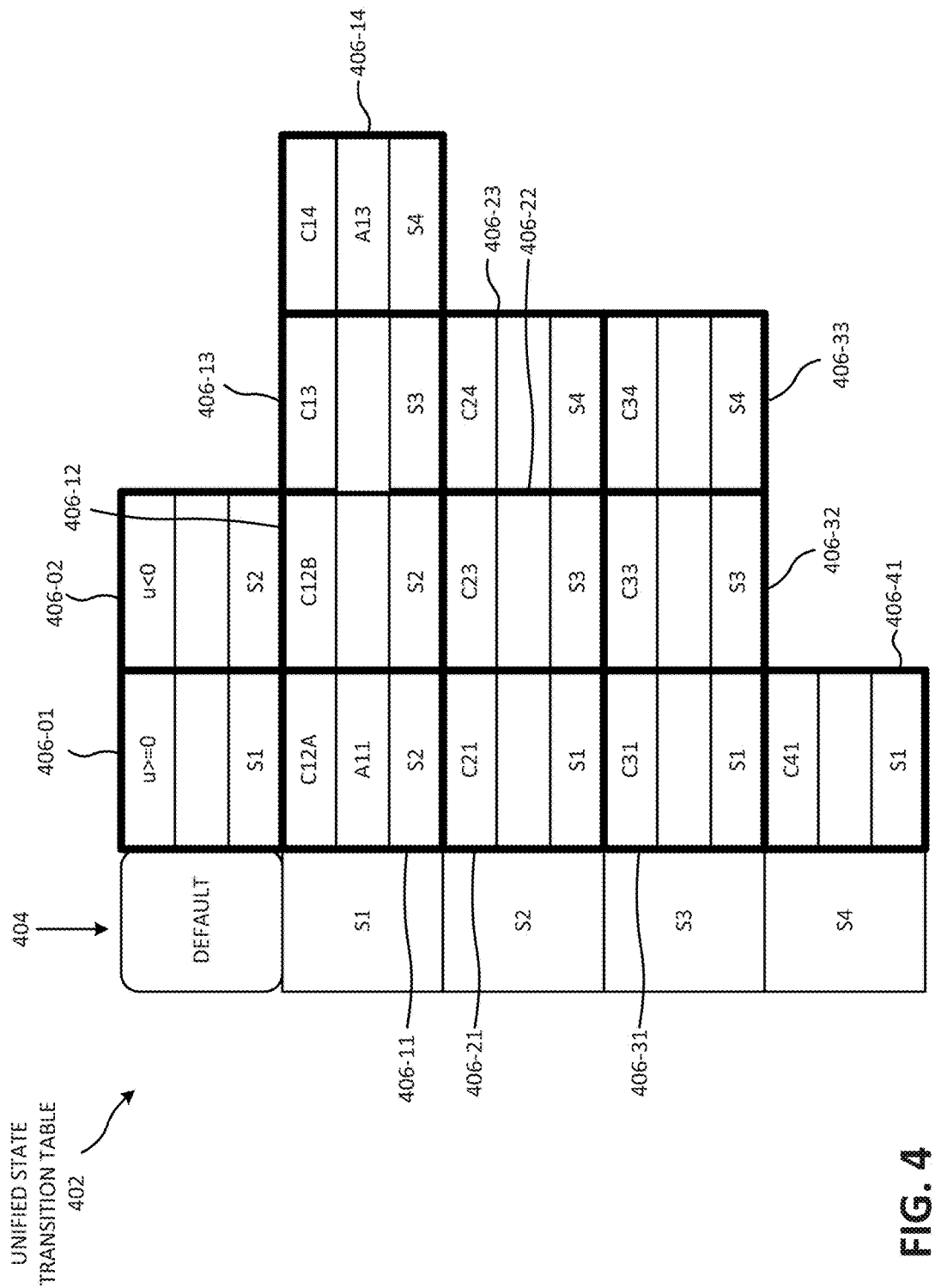
FIG. 4 illustrates a data structure describing a state transition table for a state machine model in one embodiment.

As shown in FIG. 4, transition table 402 describes a default junction and four states: state S1, state S2, state S3, and state S4. Cells 406-11 and 406-12 describe a transition from state S1 to state S2 when either condition C12A is satisfied (cell 406-11) or condition C12B is satisfied (cell 406-12). As discussed above, the condition fields that specify condition C12A and/or condition C12B may each also include an event upon which, when it occurs, the corresponding condition is evaluated. For convenience and ease of understanding, in the example embodiment of FIG. 4, condition fields in transition table 402 are considered not to include events. Further, transition table 402 describes that when the state machine model is in state S1 and condition C12A is satisfied, the state machine model executes action A11 (cell 406-11). Transition table 402 describes a transition to state S3 when the state machine model is in state S1 when condition C13 is satisfied (cell 406-13). Transition table 402 also describes a transition to state S4 and an action A13 when the state machine model is in state S1 and condition C14 is satisfied (cell 406-14).

When the state machine model is in state S2, transition table 402 describes a transition to state S1 when condition C21 is satisfied (cell 406-21); a transition to state S3 when condition C23 is satisfied (cell 406-22); and a transition to state S4 when condition C24 is satisfied (cell 406-23). When the state machine model is in state S3, transition table 402 describes a transition to state S1 when condition C31 is satisfied (cell 406-31); a transition to state S3 when condition C33 is satisfied (cell 406-32); and a transition to state S4 when condition C34 is satisfied (cell 406-33). Finally, when the state machine model is in state S4, transition table 402 describes a transition to state S1 when condition C41 is satisfied (cell 406-41).

Transition table 402 may also describe one or more junction states. A junction state may be considered a particular type of state in which the state machine model does not rest but immediately transitions to another state. In other words, a junction state identifies one or more conditions, for exit to another state. That is, the junction state is associated with one or more conditions that ensure that the state machine model transitions to one of the destination states and does not rest in the junction state. If none of the outgoing transitions of a junction state is enabled, in one embodiment, the transition may revert back to the source state. A junction state may be distinguished in transition table 402 from the other states by, for example, displaying rounded corners surrounding the field identifying the junction name.

In the exemplary embodiment of FIG. 4, transition table 402 describes a default state (e.g., a default transition row labeled "default") that is the state in which the state machine model is to start. In this embodiment, the default state may also be a junction state. The default state may be evaluated or executed first when the state machine model is executed. The default state in transition table 402 describes two conditions in cell 406-01 and cell 406-02: $u\geq=0$ and $u<0$. One of the two conditions for the default state (or junction) should always be satisfied and the state machine model is to transition to state S1 or state S2 depending on whether $u\geq=0$ or $u<0$, respectively.

FIG. 4 may also illustrate an exemplary display of the information in table 402. That is, table 402 may be displayed on a screen of the display device (e.g., output device 280) substantially as shown in FIG. 4. Table 402 may also be displayed in other ways, such as in a state-state format, a state-condition format, a state-event format, or a combination of formats.

Figure 5A:
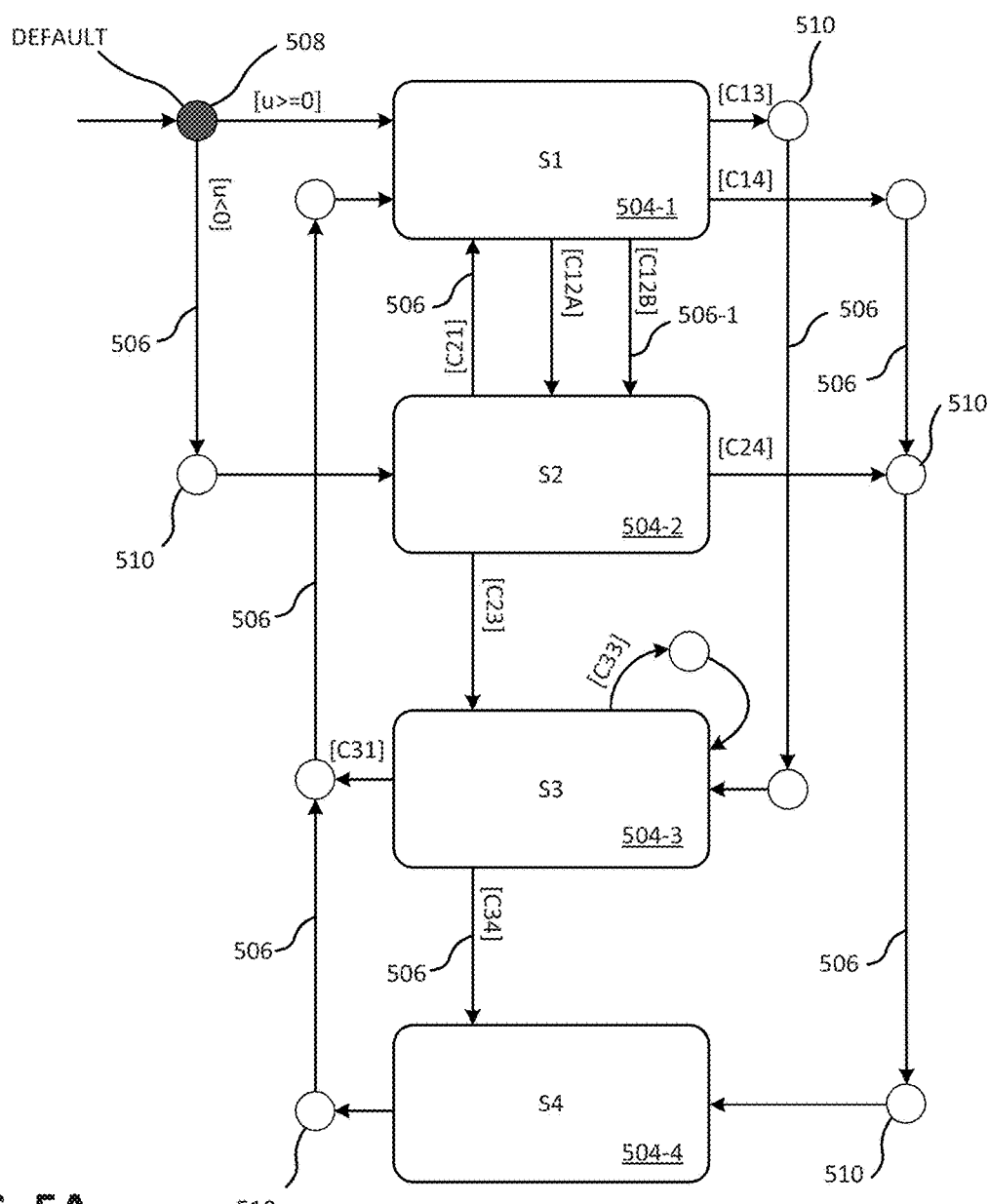
FIGS. 5A and 5B illustrate a state diagram of a state machine model described by the state transition table of FIG. 4.

FIG. 5A is a state diagram 502 that corresponds to the unified state transition table 402 of FIG. 4. That is, the semantics of the state machine model described by transition table 402 and the semantics of the state machine model described by state diagram 502 may be considered the same (e.g., also including the execution order, for example). State diagram 502 may be generated (e.g., by computer device 210) from the information stored in transition table 402, for example. Both transition table 402 and state diagram 502 may be considered data to describe a state machine model. As shown in FIG. 5A, state diagram 502 may include graphical symbols such as rectangles 504-1 through 504-4 (individually "rectangle 504" or "rectangle 504-x"). Rectangles 504 may represent states including source states and/or destination states. In state diagram 502, rectangle 504-1 represents state S1; rectangle 504-2 represents state S2; rectangle 504-3 represents state S3; and rectangle 504-4 represents state S4. In one embodiment, the width and/or height of rectangles 504 are all the same or similar width. In one embodiment, the width and/or height of rectangles 504 may vary depending on other factors discussed below.

In one embodiment, state diagram 502 may represent junction states graphically differently than other non-junction states. In this embodiment, state diagram 502 may include graphical symbols such as circle 508 to represent junctions. Circle 508 represents the default junction described in cell 406-01 and cell 406-02 of transition table 402. In this embodiment, circle 508 (also "default junction 508") is highlighted with grey and an incoming arrow with no connected source state to distinguish it from other graphical symbols in state diagram 502.

State diagram 502 may also include graphical symbols, such as lines 506 (individually "line 506-x") with arrows, to represent transitions between states (including junctions). That is, the syntax of a line may represent the semantic of a transition. Both the syntax ("line") and its semantic ("transition") may use the same reference number 506 in FIGS. 5A and 5B. For example, state diagram 502 includes line 506-1 to represent the transition between state S1 and state S2 when condition C12B is satisfied. In one embodiment, the height of a rectangle 504-x may vary depending on the number of lines 506 representing transitions on the sides (e.g., left and/or right) of the rectangle 504-x. Likewise, the width of a rectangle 504-x may vary depending on the number of lines 506 representing transitions on the top and/or bottom of the rectangle 504-x. When multiple lines 506 are associated with a state (e.g., on the left, right, top, or bottom), lines 506 may be equally spaced.

State diagram 502 may include graphical symbols such as circles 510 (individually "circle 510-*x*") to represent transition junctions (also collectively "junctions 510," and individually "junction 510-*x*"). Like the default junction represented by circle 508, transition junctions may be considered a particular type of state in which the state machine model does not rest but immediately transitions to another state. That is, the syntax of a circle may represent the semantic of a junction. Both the syntax ("circle") and its semantic ("transition") may use the same reference number 510 in FIGS. 5A and 5B. Unlike the default junction represented by circle 508, in one embodiment, transition junctions 510 may not be described in transition table 402. That is, transition junctions 510 are represented in state diagram 502 (e.g. in the syntax of state diagram 502) but may not be represented in transition table 402 (e.g., in the syntax of transition table 402). Nonetheless, the semantics of the state machine model described by transition table 402 may be preserved in state diagram 502. Transition junctions 510 may be function as source states (junctions) or destination states (junctions) in state diagram 502. Transition junctions 510 may be represented by a graphical symbol (a circle) that is associated with a semantic (junction) even though its introduction into state diagram 502 does not change the overall semantic of state diagram 502.

Transition junctions 510 may be generated for ease of understanding state diagram 502. For example, transition junctions 510 may reduce the number of lines 506 to graphically represent transitions between states (including junctions). In state diagram 502, transition junctions 510 are not highlighted with grey to distinguish transition junctions 510 from junctions expressly described in transition table 402 (e.g., the default junction represented by circle 508 and cell 406-01 and cell 406-02). In one embodiment, circles 510 may be omitted and lines 506 may intersect at points. In other words, the syntactical representation of a transition junction may be a point rather than a circle. Any other graphical symbol may also represent a transition junction.

Consistent with cell 406-01 and cell 406-02 of transition table 402, state diagram 502 shows a transition to state S1 from default junction 508 when u>=0 and a transition to state S2 when u<0. Likewise, state diagram 502 shows a transition from state S1 to state S2 when either condition C12A is satisfied (consistent with cell 406-11) or condition C12B is satisfied (consistent with cell 406-12). For ease of understanding, actions are omitted from state diagram 502 (e.g., action A11). In other embodiments, state diagram 502 may display actions, for example, along with the conditions. State diagram 502 also shows a transition from state S1 to state S3 when condition C13 is satisfied (consistent with cell 406-13) and a transition to state S4 when condition C14 is satisfied (consistent with cell 406-14).

State diagram 502 shows a transition from state S2 to state S1 when condition C21 is satisfied (consistent with cell 406-21); a transition to state S3 when condition C23 is satisfied (consistent with cell 406-22); and a transition to state S4 when condition C24 is satisfied (consistent with cell 406-23). State diagram 502 shows a transition from state S3 to state S1 when condition C31 is satisfied (consistent with cell 406-31); a transition to state S3 when condition C33 is satisfied (consistent with cell 406-32); and a transition to state S4 when condition C34 is satisfied (consistent with cell 406-33). Finally, state diagram 502 shows a transition from state S4 to state S1 when condition C41 is satisfied (consistent with cell 406-41).

As noted above, computer device 210 may generate state diagram 502 from transition table 402. FIG. 6A is a flowchart of a process 600 for generating a state diagram from data describing a state machine model. Process 600 may be executed (e.g., automatically) by computer device 210. Process 600 may begin with data (e.g., a model) describing the semantic information of a state machine model (e.g., transition table 402) being read (block 602) from a computer-readable medium by computer device 210. The data describing the state machine model may include a state table (such as table 102 or table 104) or may include a state diagram (such as state diagram 122). In other words, the data describing the state machine model may include any type of syntax to describe the semantic of a state machine model.

Process 600 may continue with the generation of data to describe a state diagram (block 604) from the data describing the state machine model. For example, computer device 210 may generate state diagram 502 from transition table 402. Generating data to describe the state machine model may include syntactical elements (e.g., transition junctions 510 or states) that do not appear in the corresponding transition table. Nonetheless, the semantics of the state machine model represented by the data describing the state diagram may be the same as the semantics of the state machine model After generating the data to describe the state diagram (block 604), the state diagram may be displayed to the user (block 606). For example, state diagram 502 of FIG. 5A may be displayed on the display device. In one embodiment, computer device 210 may receive an edit (e.g., from a user) to change or update the data describing the state machine model (e.g., transition table 402) (block 608). In this case, the data describing the state machine model (e.g., transition table 402) may be updated (block 610) and process 600 may begin again, resulting in state diagram 502 being generated dynamically (e.g., as the user edits the information in transition table 402). In one embodiment, the semantics of the state machine model described by transition table 402 is the same as the semantics of the state machine model described by state diagram 502, for example, including the execution order.

Figure 5B:
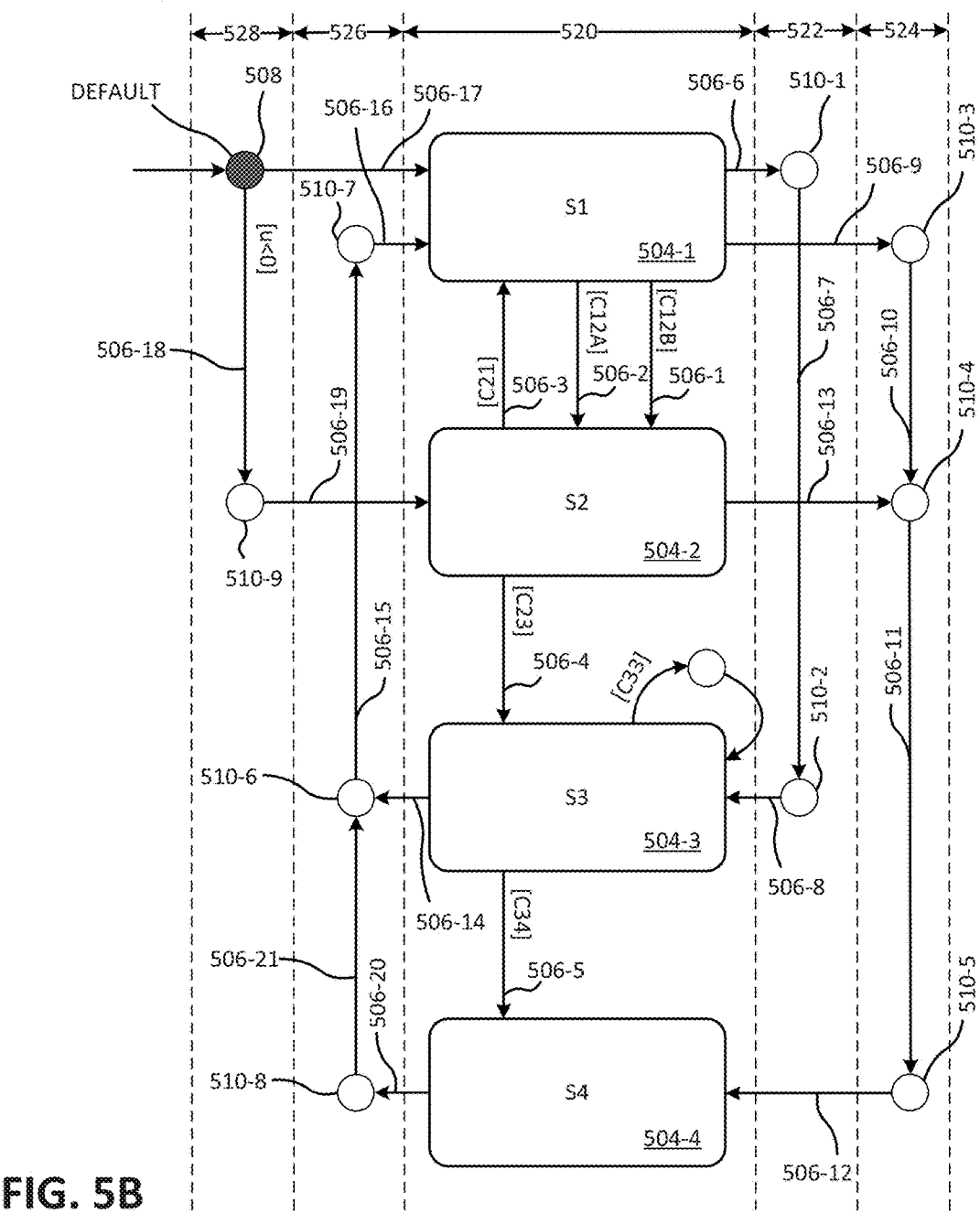

Generating data to describe a state diagram (block 604) may itself be described as a process. FIG. 6B is a flowchart of process 604 (e.g., block 604 in FIG. 6A) for generating data to describe a state diagram, such as state diagram 502. FIG. 5B shows state diagram 502 (also shown in FIG. 5A) with additional markings to illustrate process 604. Some marking (such as some conditions) that are shown in state diagram 502 of FIG. 5A are omitted from state diagram 502 in FIG. 5B for clarity. Process 604 may begin with generating data to arrange the graphical symbols that represent the source and destination states in a column (block 604-1). For example, as shown in state diagram 502 in FIG. 5B, rectangles 504 that represent state S1, state S2, state S3, and state S4 are arranged in a column 520, which is defined by two dashed lines. Columns (e.g., column 520) may also be described as rows (e.g., row 520). That is, columns in state diagram 502 may be arranged horizontally rather than vertically. In one embodiment, dashed lines designating column 520 (and columns 522, 524, 526 and 528) may not be shown in state diagram 502, but are used in FIG. 5B for ease of understanding. In one embodiment, default junctions (e.g., default junction 508 and/or other junction states) may be arranged to be outside column 520 that includes rectangles 504. In another embodiment, junction states other than the default junction (e.g., default junction 508) may be included in column 520.

In one embodiment, all the source and destination states (excluding junction and/or default junctions) may be arranged in a single column (e.g., not more than one column), such as column 520. In one embodiment, rectangles 504 representing states may be arranged in the same order (e.g., from top to bottom) as the order of the states stored and/or displayed in transition table 402. In this embodiment, the execution order (and thus the semantic) of the state machine model represented by transition table 402 and state diagram 502 may stay the same. Alternatively, the order of rectangles 504 may change (as compared to transition table 402) while the execution order (and thus semantic) stay the same. In another embodiment, rectangles 504 that represent states may be arranged in a different order (e.g., from top to bottom) than the order of the states stored and/or displayed in transition table 402. For example, rectangles 504 may be arranged in a way so that states with transitions are adjacent to each other. In one embodiment, states with the greatest number of transitions to each other are arranged to be adjacent to each other. Nonetheless, state diagram 502 may be generated to maintain the same semantic of the state machine model as represented by transition table 402. In one embodiment, lines representing transitions to and/or from a single state (e.g., lines 506-1 through 506-3) may be generated so as to be equally spaced. In another embodiment, rectangles 504 to represent states may be arranged in more than a single column (e.g., two columns) that do not overlap.

Process 604 may include generating data to arrange transition lines to destination states that are adjacent to respective source states (block 604-2). For example, state S1 is adjacent to state S2 in state diagram 502. In one embodiment, transitions from state S1 to state S2 and transitions from state S2 to state S1 may be represented by one or more lines 506 (e.g., vertical lines 506-1, 506-2, and 506-3) in column 520. Likewise, state S2 is adjacent to state S3 in state diagram 502. Thus, in this embodiment, transitions from state S2 to state S3 may be represented by one or more lines 506 (e.g., vertical line 506-4) in column 520. Likewise, transitions from state S2 to state S1 (not shown) may also be represented by one or more lines in column 520. In addition, state S3 is adjacent to state S4 in state diagram 502. Thus, in this embodiment, transitions from state S3 to state S4 may be represented by one or more lines 506 (e.g., vertical line 506-5) in column 520. Likewise, transitions from state S4 to state S3 (not shown) may also be represented by one or more lines in column 520. As discussed above, in one embodiment, rectangles 504 may be arranged in an order in column 520 such that the number of lines 506 (representing transitions) in column 520 is maximized (e.g., such as to maximize the number of destination states adjacent to their respective source states).

Process 604 may include generating data to arrange transition lines to destination states from source states that are not adjacent to their respective source states (block 604-3). For example, as shown in state diagram 502 of FIG. 5B, state S3 is not adjacent to state S1. In one embodiment, transitions from state S1 to state S3 may be represented by one or more lines 506 (e.g., vertical line 506-7 and horizontal lines 506-6 and 506-8). In this embodiment, one or more of the lines 506 (e.g., vertical line 506-7) may be arranged to appear in column 522. In one embodiment, column 522 does not overlap with column 520 (or columns 524, 526, or 528). In this embodiment, column 522 may be for transition lines to destination state S3. That is, column 522 may be a "lane" dedicated to transition lines to state S3. Other lines 506 (e.g., lines 506-9 and 506-12) may pass through column 522 to represent transitions to states other than state S3 (e.g., state S4). In other words, in one embodiment, the vertical lines 506 in column 522 may all be for representing transitions to destination state S3 and column 522 may omit vertical lines to other destination states (e.g., state S4). Providing or defining a lane or column for arranging lines to a destination state allows state diagram 502 to be generated in a way that is easier to read and avoids collisions (or overlapping) of lines representing transitions.

In one embodiment, transition junctions 510 (e.g., transition junctions 510-1 and 510-2) may be generated as graphical symbols to show the relationship between lines 506 (e.g., lines 506-6 and 506-7). In a different embodiment, transition junctions 510 may be omitted (e.g., lines 506-6 and 506-7 may intersect at a point).

As another example, state S4 is also not adjacent to state S1. In this embodiment, transitions from state S1 to state S4 may be represented by one or more lines 506 (e.g., vertical lines 506-10 and 506-11, and horizontal lines 506-9 and 506-12). In this embodiment, one or more of the lines 506 (e.g., vertical lines 506-10 and 506-11) may be arranged to appear in column 524. In one embodiment, column 524 does not overlap with columns 520, 522, 526, or 528. In this embodiment, column 524 may be for transition lines to destination state S4. That is, column 524 may be a "lane" dedicated to transition lines to state S4. Other lines (not shown in this example) may pass through column 524 to represent transitions to states other than state S4. In one embodiment, that is, the vertical lines 506 in column 524 may all be for representing transitions to destination state S4 and column 524 may omit vertical lines to other destination states (e.g., state S3). In this embodiment, lines 506-9, 506-10, 506-11, and 506-13 are syntactical elements (e.g., representing transitions) that do not have a one-to-one correspondence in transition table 402, for example. That is, because in this example there is no state (e.g., junction) corresponding to transition junction 510-3 in transition table 402, lines 506-9, 506-10, and 506-11 represent transitions that do not have a direct correspondence to transitions in transition table 402.

Likewise, state S2 is not adjacent to state S4 in state diagram 502. Thus, in this embodiment, transitions from state S2 to state S3 may be represented by one or more lines 506 (e.g., vertical line 506-11 and horizontal lines 506-13 and 506-12) in column 524. Because the transition from state S2 is to state S4, lines 506 representing the transition may appear in the "lane" dedicated to transitions to state S4. Thus, lines 506 representing the transition from state S2 to state S4 in state diagram 502 appear in column 524. Further, to reduce the number of lines, in one embodiment, lines 506 may be arranged such that the transition from state S2 to state S4 may share one or more lines 506 (e.g., lines 506-11 and 506-12) that also represent one or more transitions to state S4 from other states (e.g., state S1). In another embodiment, transitions to the same destination state (e.g., state S4) from different source states (e.g., state S1 and state S2) may not share lines 506.

In one embodiment, transition junctions 510 (e.g., transition junctions 510-3, 510-4, and 510-5) may be generated as graphical symbols to show the relationship between lines 506 (e.g., lines 506-9 through 506-13 that represent transitions to transition junctions). In this embodiment, transition junction 510-4 may allow for the transition from state S2 and state S4 to share a line (e.g., lines 506-11 and 506-12). Thus, transitions to a single destination state (e.g., state S4) may share a lane (e.g., column 524) and may share one or more lines 506 in that lane. In a different embodiment, circles 510 may be omitted and lines 506-10, 506-11, and 506-13 may intersect at a point (e.g., a different graphical symbol in the syntax), for example. In other words, transition junctions 510-3, 510-4, and 510-5 are syntactical elements that represent states (e.g., junctions) that are not represented by the syntax of transition table 402. Therefore, lines 506-9 through 506-13 represent transitions that do not have a direct correspondence to transitions in transition table 402. In one embodiment, lines representing transitions to and/or from a single source state (e.g., lines 506-6 and 506-9 from state S1) may be generated so as to be equally spaced.

As another example, neither state S4 nor state S3 is adjacent to state S1. In this embodiment, transitions from state S3 to state S1 may be represented by one or more lines 506 (e.g., vertical line 506-15 and horizontal lines 506-14 and 506-16). In this embodiment, one or more of the lines 506 (e.g., vertical line 506-15) may be arranged to appear in column 526. In one embodiment, column 526 does not overlap with column 520 or the other columns (e.g., columns 522, 524, or 528). In this embodiment, column 526 may be for transition lines to destination state S1. That is, column 526 may be a "lane" dedicated to transition lines to state S1. Other lines (e.g., lines 506-17 and 506-19) may pass through column 526 to represent transitions to states other than state S1. In one embodiment, that is, the vertical lines 506 in column 526 may all be for representing transitions to destination state S1 and column 526 may omit vertical lines representing transitions to other states (e.g., state S2).

Likewise, in this embodiment, transitions from state S4 to state S1 may be represented by one or more lines 506 (e.g., vertical lines 506-21 and 506-15, and horizontal lines 506-20 and 506-16) in column 526. Because the transition from state S4 is to state S1, lines 506 representing the transition may appear in the "lane" dedicated to transitions to state S1 (e.g., column 526). Further, to reduce the number of lines, in one embodiment, lines 506 may be arranged such that the transition from state S4 to state S1 may share one or more lines 506 (e.g., lines 506-15 and 506-16) that also represent one or more transitions to state S1 from other states (e.g., state S3). In another embodiment, transitions to the same destination state (e.g., state S1) from different source states (e.g., state S3 and state S4) may not share lines 506.

In one embodiment, transition junctions 510 (e.g., transition junctions 510-6, 510-7, and 510-8) may be generated as graphical symbols to show the relationship between lines 506 (e.g., lines 506-14, 506-15, 506-16, 506-20 and 506-21 representing transitions to junctions 510). In this embodiment, transition junction 510-6 may allow for the transition from state S3 and state S4 to share a line (e.g., lines 506-15 and 506-16 representing a transition). Thus, transitions to a single destination state (e.g., state S1) may share a lane (e.g., column 526) and may share one or more lines 506 (e.g., representing transitions to or from a state) in that lane. In a different embodiment, circles 510 may be omitted transition junctions 510 may be represented by points and lines 506 may intersect at the points, for example.

As with the description above, transition junctions 510-6 through 510-8 are syntactical elements that represent states (e.g. junctions) that are not represented by the syntax of transition table 402. Therefore, lines 506-14, 506-15, 506-16, 506-20 and 506-21 represent transitions that do not have a one-to-one correspondence to transitions in transition table 402.

In one embodiment, lines 506 representing transitions in the upward direction (e.g., from state S4 to state S1) may be generated to appear on one side (e.g., the left side) of column 520. Further, lines 506 representing transitions in the downward direction (e.g., from state S1 to state S4) may be generated to appear on one the other side (e.g., the right side) of column 520.

In one embodiment, the state machine model of state diagram 502 may be represented in tabular format including the transition junctions defined as states (e.g., defined in a row or column of a table). In this embodiment, the transition junctions may be identified as added states (e.g., for the purpose of having generated a state diagram that does not change the overall semantics of the state machine model). In one embodiment, the added syntactical elements (and their graphical representation) may be associated with a state machine model semantic (e.g. a junction) that is already familiar to the user and already standard in state diagrams. Therefore, the user does not have to learn new associations between syntax and semantics. For example, transition junctions 510 use the same symbol (a circle) and have the same semantic as junction 508 (a default junction described in transition table 402). Likewise, lines 506-11 and 506-10 use the same symbol (a line) and have the same semantic as line 506-17 (a line described in transition table 402). Other syntactic elements may be introduced into state diagram 502 that have known syntax and semantics but do not change the overall semantics of the state machine model represented by the state diagram.

In one embodiment, the user may insert a transition junction 510 manually without changing the semantic of the state machine model. For example, the user may select a graphical representation (e.g., a circle) of a junction transition from a toolbar, drag the graphical representation onto the state diagram (e.g., state diagram 502), and drop the graphical representation on a line (e.g., a line 506-x that represents a transition from a source state to a destination state). Computer device 210 may then automatically generate new data to replace the data that describes the line that represents the transition from the source state to the destination state. This new data may describe a line to represent a transition from the source state to the transition junction and a line to represent a transition from the transition junction to the destination state. In one embodiment, inserting a transition junction in this manner does not change the semantics of the state machine model. In another embodiment, the user may alter the semantics of the state machine model by editing the information related to the transition junction by, for example, adding a condition and an additional line to represent a transition to another destination state.

Although lines 506 in state diagram 502 are straight lines, the term "lines" as used herein does not necessarily denote a straight line. A "line" as the term is used may include some curvature. A "straight line" as used herein does not include curvature.

Thus, embodiment described above introduce additional syntactical description to the state diagram that do not alter the semantic of the state machine model, for example. By introducing additional syntactic description, the semantics of the state machine model may be more comprehensible by a human. In one embodiment, a state diagram (e.g., with the additional syntax) may be generated from a state table or another state diagram of a state machine model (e.g., while preserving the semantics of the state machine model whatever the source representation of the state machine model).

This application incorporates by reference U.S. patent application Ser. No. 13/768,565, filed Feb. 15, 2013, titled "Unified State Transition Table Describing a State Machine Model,".

CONCLUSION

As used herein, the article "a" is intended to include one or more items. For example, "a computer-readable medium" that holds instructions may refer to and/or cover computer-readable media (e.g., more than one computer-readable medium) that hold instructions. As another example, "a processor" that executes one or more instructions may refer to and cover one or more processors that execute instructions. As yet another example, "an instruction" may refer to and cover more than one instruction.

The text herein describes columns as vertical and rows as horizontal. These terms ("column," "row," "vertical," "horizontal") are intended to denote the relative relationship of sets of fields (e.g., orthogonal) and not necessarily the particular vertical and/or horizontal aspects. Therefore, an embodiment that describes and/or displays a first set of fields in a horizontal row and a second set of fields in a vertical column is also understood to disclose an embodiment that describes and/or displays the first set of fields in a vertical column and the second set of fields in a horizontal row. Likewise, the text herein describes lines as vertical or lines as horizontal. These terms ("lines," "vertical," "horizontal") are intended to denote the relative relationship of the lines (e.g., orthogonal) and not necessarily the particular vertical and/or horizontal aspects. Therefore, an embodiment that describes and/or displays a first horizontal line and a second vertical line is also understood to disclose an embodiment that describes and/or displays the first line as vertical and the second line as horizontal. The term "row" may be used and described as being vertical or horizontal. Nonetheless, when the term "row" is used in conjunction with "column" it denotes the relationship (e.g., orthogonal). That is, a "row" is not limited to being horizontal.

Data describing a state machine model may include instructions and/or computer code (e.g., in a computer or other language) describing the state machine model. The instructions and/or computer code may include C, C++, C#, a programmable logic controller (PLC) language, Ada, Java, MATLAB®, Unified Modeling Language (UML), System Modeling Language (SysML), Extensible Markup Language (XML), Modeling and Analysis of Real Time and Embedded Systems (MARTE), Hardware Description Language (HDL), and/or Automotive Open System Architecture (AUTOSAR).

The term "holding" is intended to be an open-ended term. For example, a medium described as holding one or more elements is intended to mean that the medium holds machine-readable instructions representing the one or more elements listed and may also include additional, unnamed elements. The term "holding one or more instructions" may include "storing one or more instructions."

As described above, a state diagram may include graphical symbols. In one embodiment, "each of" the graphical symbols in the state diagram represents one of the source states or one of the destination states. In this embodiment, the state diagram may include other graphical symbols that represent things other than source states and/or destination states. That is, the term "each of" is used to describe the characteristics of each graphical symbol that has those characteristics, and does not necessarily mean that all the graphical symbols in the state diagram have those characteristics. Further, in this embodiment, not all source states and/or destination states in the state machine model (that is represented by the state diagram) are necessarily represented by a graphical symbol.

As used herein, a first graphical symbol representing a first state of a state machine model is not considered "adjacent to" a second graphical symbol representing a second state when a graphical symbol representing a third state of the same state machine model is between the first graphical symbol and the second graphical symbol. On the other hand, the first graphical symbol is considered "adjacent to" the second graphical symbol is immediately adjacent to the first graphical symbol, i.e., when no graphical symbol representing any other state of the same state machine model is between the first graphical symbol and the second graphical symbol.

As described above, stored data may describe a state machine model having source states and destination states. In one embodiment, "each of" the source states in may be associated with a condition upon which the state machine model transitions (or is to transition) from the corresponding source state to one of the destination states. In this embodiment, as part of the same state machine model, the data may describe additional source states that are not associated with any conditions. That is, the term "each of" is used to describe the characteristics of each source state that has those characteristics, and does not necessarily mean that all of the source states in the state machine model have those characteristics. In addition, in this embodiment, there may be conditions that are associated with things other than source states.

In one embodiment, a method described above includes generating data to describe a state diagram. In this embodiment, the state diagram may include graphical symbols to represent source states and destination states and lines to represent transitions.

This method may include "arranging" the graphical symbols in a first column. The term "arranging," for example, includes generating the data to describe the state diagram such that graphical symbols, as described, are to appear in the state diagram in a first column. Likewise, "arranging" lines in a second column includes generating the data to describe the state diagram such that the lines, as described, are to appear in the state diagram a second column.

As used herein, the term "data" may be interpreted as being singular as well as plural. Thus, "data that describes a state machine model" may by synonymous with "a datum that describes a state machine model."

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 2A, 2B, and 3 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software. No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

What is claimed is:

1. A non-transitory computer-readable medium that holds instructions executable by a processor, the computer-readable medium comprising:
   one or more instructions to read data that describes a state machine model, the state machine model having semantics and including:
      destination states, and
      source states associated with conditions that, when one or more of which is satisfied, enable the state machine model to transition from a corresponding source state to a corresponding destination state;
   one or more instructions to automatically generate an executable state diagram from the data that describes the state machine model, the executable state diagram including:
      first graphical symbols, each of the first graphical symbols to represent one of the source states or one of the destination states, the first graphical symbols associated with first code modules of a modeling system that implement functionality of the one of the source states or the one of the destination states according to a model of computation, where the model of computation is based on at least one of control flows, process networks, or state machines,
      second graphical symbols, each of the second graphical symbols to represent one of a plurality of junctions not described by the data, and
      transition symbols to represent transitions, including a first transition symbol and a second transition symbol, the transition symbols associated with second code modules of the modeling system that implement functionality of the transitions as determined by the model of computation in response to events occurring or the one or more of the conditions being satisfied;
   one or more instructions to arrange a plurality of the first graphical symbols and a plurality of the second graphical symbols of the executable state diagram in a non-overlapping manner, including aligning the plurality of the first graphical symbols in a first lane and aligning a set of the plurality of the second graphical symbols that represent respective junctions in a second lanes dedicated to a sets of the transition symbols, the set of the transition symbols leading to a selected first graphical symbol, of the plurality of the first graphical symbols, that represents a selected destination states, wherein the first lane and the second lane are non-overlapping;
   one or more instructions to arrange the transition symbols, wherein the first transition symbol represents a first one of the transitions, from a first one of the source states to a first one of the plurality of junctions,
      wherein the second transition symbol represents a second one of the transitions, from the first one of the plurality of junctions to a first one of the destination states, and
      wherein the first transition symbol and the second transition symbol semantically replace a description in the data of a transition from the first one of the source states to the first one of the destination states; and
   one or more instructions for displaying the executable state diagram, wherein the executable state diagram preserves the semantics of the state machine model described by the data.

2. The non-transitory computer-readable medium of claim 1, further comprising:
   one or more instructions to arrange the plurality of the first graphical symbols in a first row or column that is the first lane; and
   one or more instructions to arrange the plurality of the second graphical symbols in a second row or column that is the second lane and that does not overlap with the first row or column.

3. The non-transitory computer-readable medium of claim 2, wherein the transition symbols include one or more horizontal or vertical lines to represent the transitions to a given one of the destination states from a plurality of the source states, and wherein the first graphical symbol to represent the given one of the destination states is not adjacent to the first graphical symbols to represent the plurality of the source states, the medium further comprising:
   one or more instructions to arrange the one or more horizontal or vertical lines in a third row or column that does not overlap with the first row or column;
   one or more instructions to define additional rows or columns, wherein the additional rows or columns include the third row or column, wherein each of the additional rows or columns is associated with a corresponding different one of the destination states, and wherein each of the additional rows or columns does not overlap with the first row or column or any other of the additional rows or columns, wherein each of the additional rows or columns includes:
      one or more horizontal or vertical lines to represent the transitions to the corresponding different one of the destination states from more than one of the source states, wherein the first graphical symbol to represent the corresponding different one of the destination states is not adjacent to the first graphical symbols to represent the more than one of the source states.

4. The non-transitory computer-readable medium of claim 3, wherein each of the additional rows or columns does not include a horizontal or vertical line to represent any transition other than the transitions to the corresponding different one of the destination states.

5. The non-transitory computer-readable medium of claim 4, further comprising:
   one or more instructions to arrange, in the first row or column, a horizontal or vertical line to represent the transition from another one of the source states to another one of the destination states, wherein the first graphical symbol to represent the other one of the destination states is adjacent to the first graphical symbol to represent the other one of the source states.

6. The non-transitory computer-readable medium of claim 3, wherein the one or more horizontal or vertical lines to represent the transitions to the given one of the destination states from the plurality of sources states includes a single horizontal or vertical line to represent more than one of the transitions.

7. The non-transitory computer-readable medium of claim 6, wherein the transition symbols to represent the transitions include a line from each of the first graphical symbols to represent the plurality of source states to the single horizontal or vertical line.

8. The non-transitory computer-readable medium of claim 7, further comprising:
one or more instructions to arrange a second graphical symbol to represent an intersection of the single horizontal or vertical line and one of the transition symbols from the first graphical symbols to represent the more than one of the source states.

9. The non-transitory computer-readable medium of claim 3,
wherein the transition symbols to represent the transitions from the source states to the destination states, in which the corresponding first graphical symbol to represent the destination state is below but not adjacent to the corresponding first graphical symbol to represent the source state, other than a default first transition starting the state machine model, are outside and to one side of the first row or column, and
wherein the transition symbols to represent the transitions from the source states to the destination states, in which the corresponding first graphical symbol to represent the destination state is above but not adjacent to the corresponding first graphical symbol to represent the source state, other than the default first transition starting the state machine model, are graphically outside and to another side of the first row or column, wherein the another side is opposite the one side.

10. The non-transitory computer-readable medium of claim 1 wherein the data that describes the state machine model is
a state-state table,
a state-condition table,
a state-event table, or
a unified state transition table.

11. A non-transitory computer-readable medium that holds instructions executable by a processor, the computer-readable medium comprising:
one or more instructions to read data that describes a state machine model, the state machine model including:
destination states, and
source states associated with conditions upon which the state machine model is to transition from a corresponding source state to a corresponding destination state,
wherein a first plurality of the source states are to transition to a first destination state of the destination states, and wherein a second plurality of the source states are to transition to a second destination state of the destination states;
one or more instructions to automatically generate an executable state diagram from the data that describes the state machine model, the executable state diagram including:
first graphical symbols, each of the first graphical symbols to represent one of the source states or one of the destination states, the first graphical symbols associated with first code modules of a modeling system that implement functionality of the one of the source states or the one of the destination states according to a model of computation, where the model of computation is based on at least one of control flows, process networks, or state machines,
second graphical symbols, each of the second graphical symbols to represent one of a plurality of junctions not described by the data, and
transition symbols to represent transitions, the transition symbols associated with second code modules of the modeling system that implement functionality of the transitions as determined by the model of computation in response to events occurring or the conditions being satisfied, wherein the transition symbols include one or more horizontal or vertical lines to represent the transitions to the first destination state from the first plurality of the source states, and wherein the transition symbols include one or more horizontal or vertical lines to represent the transitions to the second destination state from the second plurality of source states;
one or more instructions to arrange a plurality of the first graphical symbols and a plurality of the second graphical symbols of the executable state diagram in a non-overlapping manner, including aligning the plurality of the second graphical symbols that represent respective junctions in lanes dedicated to sets of the transition symbols that lead to particular ones of the plurality of the first graphical symbols that represent respective destination states;
one or more instructions to arrange the plurality of the first graphical symbols in a first row or column that is a first lane;
one or more instructions to arrange the transition symbols such that
the one or more horizontal or vertical lines to represent the transitions to the first destination state are aligned within a second row or column that is a second lane, wherein the second lane is separate from the first lane and does not overlap the first lane, and
the one or more horizontal or vertical lines to represent the transitions to the second destination state are aligned within a third row or column that is a third lane, wherein the third lane is separate from the first lane and the second lane and does not overlap the first lane and the second lane.

12. The non-transitory computer-readable medium of claim 11,
wherein the second row or column does not include a horizontal or vertical line to represent any transition other than to the first destination state, and
wherein the third row or column does not include a horizontal or vertical line to represent any transition other than to the second destination state.

13. The non-transitory computer-readable medium of claim 11,
wherein the first graphical symbols to represent each of the first plurality of the source states are not adjacent to the first graphical symbol to represent the first destination state, and
wherein one of the source states transitions to the first destination state, wherein the first graphical symbol to represent the one of the source states is adjacent to the first graphical symbol to represent the first destination state, and wherein the transition symbol to represent the transition from the one of the source states to the first destination state includes a horizontal or vertical line aligned in the first row or column.

14. The non-transitory computer-readable medium of claim 11, wherein the one or more horizontal or vertical lines to represent the transitions to the first destination state from the first plurality of the source states include a single horizontal or vertical line to represent more than one of the transitions, and wherein the first plurality of the source states that transition to the first destination state include a first source state and a second source state, wherein the transition symbols to represent the transitions include:

a first line to represent the transition to the first destination state from the first source state extending between the first graphical symbol to represent the first source state to the single horizontal or vertical line, and a second line to represent the transition to the first destination state from the second source state extending from the first graphical symbol to represent the second source state to the single horizontal or vertical line.

15. The non-transitory computer-readable medium of claim 14, further comprising:

one or more instructions to arrange a graphical symbol to represent a connection of the first line and the single horizontal or vertical line.

16. The non-transitory computer-readable medium of claim 11, wherein the transition symbols to represent the transitions from the source states to the destination states, in which the corresponding first graphical symbol to represent the destination state is below but not adjacent to the corresponding first graphical symbol to represent the source state, other than a default first transition starting the state machine model, are graphically outside and to one side of the first row or column, and wherein the transition symbols to represent the transitions from the source states to the destination states, in which the corresponding first graphical symbol to represent the destination state is above but not adjacent to the corresponding first graphical symbol to represent the source state, other than the default first transition starting the state machine model, are graphically outside and to another side of the first row or column, wherein the another side is opposite the one side.

17. The non-transitory computer-readable medium of claim 11 wherein the data that describes the state machine model is a state-state table,
a state-condition table,
a state-event table, or
a unified state transition table.

18. The non-transitory computer-readable medium of claim 17 further comprising one or more instructions for displaying the state-state table, the state-condition table, the state-event table, or the unified state transition table with the executable state diagram.

19. A computing device comprising:

a memory storing data that describes a state machine model, the state machine model including:
destination states, and
source states associated with conditions upon which the state machine model is to transition from a corresponding source state to a corresponding destination state; and a processor, coupled to the memory, the processor configured to:

automatically generate an executable state diagram from the data that describes the state machine model, the executable state diagram including:

first graphical symbols, each of the first graphical symbols to represent one of the source states or one of the destination states, the first graphical symbols associated with first code modules of a modeling system that implement functionality of the one of the source states or the one of the destination states according to a model of computation, where the model of computation is based on at least one of control flows, process networks, or state machines, second graphical symbols, each of the second graphical symbols to represent one of a plurality of junctions not described by the data, and transition symbols to represent transitions, the transition symbols associated with second code modules of the modeling system that implement functionality of the transitions as determined by the model of computation in response to events occurring or conditions being satisfied; arrange a plurality of the first graphical symbols and a plurality of the second graphical symbols of the executable state diagram in a non-overlapping manner, including aligning the plurality of the second graphical symbols that represent respective junctions in lanes dedicated to sets of the transition symbols that lead to particular ones of the plurality of the first graphical symbols that represent respective destination states;

arrange the plurality of the first graphical symbols in a first row or column that is a first lane;

arrange the transition symbols, wherein the transition symbols include one or more horizontal or vertical lines to represent the transitions to one of the destination states from more than one of the source states, and wherein the first graphical symbol to represent the one of the destination states is not adjacent to the first graphical symbols to represent the more than one of the source states; and arrange the one or more horizontal or vertical lines in a second row or column that is a second lane, wherein the second lane does not overlap with the first lane; and a display to show the executable state diagram.

20. The computing device of claim 19, wherein the processor is configured to:

define additional rows or columns, wherein the additional rows or columns include the second row, wherein each of the additional rows or columns is associated with a different one of the destination states, and wherein each of the additional rows or columns does not overlap with the first row or column or any other of the additional rows or columns, wherein each of the additional rows or columns includes:

one or more horizontal or vertical lines to represent the transitions to the corresponding different one of the destination states from more than one of the source states, wherein the first graphical symbol to represent the corresponding different one of the destination states is not adjacent to the first graphical symbols to represent the more than one of the source states.

21. The computing device of claim 20, wherein each of the additional rows or columns does not include a horizontal or vertical line to represent any transition other than the transitions to the corresponding different one of the destination states.

22. The computing device of claim 21, wherein the processor is configured to:
arrange, in the first row or column, a horizontal or vertical line to represent the transition from another one of the source states to another one of the destination states, wherein the first graphical symbol to represent the other one of the destination states is adjacent to the first graphical symbol to represent the other one of the source states.

23. The computing device of claim 19,
wherein the one or more horizontal or vertical lines to represent the transitions to the given one of the destination states from the plurality of sources states includes a single horizontal or vertical line to represent more than one of the transitions.

24. The computing device of claim 23, wherein the transition symbols to represent the transitions include a line from each of the graphical symbols to represent the plurality of source states to the single horizontal or vertical line.

25. The computing device of claim 24, wherein the processor is configured to:
arrange a second graphical symbol to represent an intersection of the single horizontal or vertical line and one of the transition symbols from the first graphical symbols to represent the more than one of the source states.

26. The computing device of claim 19 wherein the data that describes the state machine model is
a state-state table,
a state-condition table,
a state-event table, or
a unified state transition table.

27. The computing device of claim 26 wherein the processor is further configured to display the state-state table, the state-condition table, the state-event table, or the unified state transition table with the executable state diagram.

28. A method comprising:
receiving, by a processor, data that describes a state machine model, the state machine model including:
destination states, and
source states associated with conditions upon which the state machine model is to transition from a corresponding source state to a corresponding destination state; and
automatically generating an executable state diagram from the data that describes the state machine model, the executable state diagram including:
first graphical symbols, each of the first graphical symbols to represent one of the source states or one of the destination states, the first graphical symbols associated with first code modules of a modeling system that implement functionality of the one of the source states or the one of the destination states according to a model of computation, where the model of computation is based on at least one of control flows, process networks, or state machines,
second graphical symbols, each of the second graphical symbols to represent one of a plurality of junctions not described by the data, and
transition symbols to represent transitions, the transition symbols associated with second code modules of the modeling system that implement functionality of the transitions as determined by the model of computation in response to events occurring or the conditions being satisfied;
arranging a plurality of the first graphical symbols and a plurality of the second graphical symbols of the executable state diagram in a non-overlapping manner, including aligning the plurality of the second graphical symbols that represent respective junctions in lanes dedicated to sets of the transition symbols that lead to particular ones of the plurality of the first graphical symbols that represent respective destination states;
arranging the plurality of the first graphical symbols in a first row or column that is a first lane;
arranging the transition symbols, wherein the transition symbols include one or more horizontal or vertical lines to represent the transitions to one of the destination states from more than one of the source states, and wherein the first graphical symbol to represent the one of the destination states is not adjacent to the first graphical symbols to represent the more than one of the source states;
arranging the one or more horizontal or vertical lines in a second row or column that is a second lane, wherein the second lane does not overlap with the first lane; and
displaying the executable state diagram on a display.

29. The method of claim 28, further comprising:
defining additional rows or columns, wherein the additional rows or columns include the second row or column, wherein each of the additional rows or columns is associated with a different one of the destination states, and wherein each of the additional rows or columns does not overlap with the first row or column or any other of the additional rows or columns, wherein each additional row or column includes:
one or more horizontal or vertical lines to represent the transitions to the corresponding different one of the destination states from more than one of the source states, wherein the first graphical symbol to represent the corresponding different one of the destination states is not adjacent to the first graphical symbols to represent the more than one of the source states.

30. The method of claim 29, wherein each of the additional rows or columns does not include a horizontal or vertical line to represent any transition other than the transitions to the corresponding different one of the destination states.

31. The method of claim 30, further comprising:
arranging, in the first row or column, a horizontal or vertical line to represent the transition from another one of the source states to another one of the destination states, wherein the first graphical symbol to represent the other one of the destination states is adjacent to the first graphical symbol to represent the other one of the source states.

32. The method of claim 28,
wherein the one or more horizontal or vertical lines to represent the transitions to the one of the destination states from the plurality of sources states includes a single horizontal or vertical line to represent more than one of the transitions.

33. The method of claim 32, wherein the transition symbols to represent the transitions include a line from each of the graphical symbols to represent the plurality of source states to the single horizontal or vertical line.

34. The method medium of claim 33, further comprising:
arranging a second graphical symbol to represent an intersection of the single horizontal or vertical line and one of the transition symbols from the first graphical symbols to represent the more than one source states.

35. The method of claim 28 the data that describes the state machine model is
- a state-state table,
- a state-condition table,
- a state-event table, or
- a unified state transition table.

36. The method of claim 35 further comprising:
- displaying the state-state table, the state-condition table, the state-event table, or the unified state transition table with the executable state diagram.

* * * * *

UNITED STATES PATENT AND TRADEMARK OFFICE
CERTIFICATE OF CORRECTION

PATENT NO. : 10,360,502 B2
APPLICATION NO. : 13/768541
DATED : July 23, 2019
INVENTOR(S) : Siddhartha Shankar et al.

It is certified that error appears in the above-identified patent and that said Letters Patent is hereby corrected as shown below:

In the Specification
Column 11, Line 62 reads:
"Maple from Maplesoft; Extend from Imagine That Inc.:"
Should read:
--Maple from Maplesoft; Extend from Imagine That Inc.;--

Column 13, Line 36 reads:
"model predictive controls (M PC), dynamic inversion con-"
Should read:
--model predictive controls (MPC), dynamic inversion con- --

Column 22, Line 67 reads:
"Model," ."
Should read:
--Model."--

In the Claims
Claim 1:
Column 25, Lines 58-59 reads:
"represent respective junctions in a second lanes dedi-
cated to a sets of the transition symbols, the set of the"
Should read:
--represent respective junctions in a second lane dedi-
cated to a set of the transition symbols, the set of the--

Claim 1:
Column 25, Line 62 reads:
"that represents a selected destination states, wherein the"
Should read:
--that represents a selected destination state, wherein the--

Signed and Sealed this
Twenty-fifth Day of February, 2020

Andrei Iancu
*Director of the United States Patent and Trademark Office*